United States Patent
Osder et al.

[19]

[11] Patent Number: 6,058,166
[45] Date of Patent: May 2, 2000

[54] ENHANCED MULTI-LINGUAL PROMPT MANAGEMENT IN A VOICE MESSAGING SYSTEM WITH SUPPORT FOR SPEECH RECOGNITION

[75] Inventors: Barbara E. Osder, Erdenheim; David R. Landolt, Harleysville; Alex Freiman, New Britain; Steven J. Capriotti; Steven Luzeski, both of Collegeville, all of Pa.

[73] Assignee: Unisys Corporation, Blue Bell, Pa.

[21] Appl. No.: 08/944,924

[22] Filed: Oct. 6, 1997

[51] Int. Cl.[7] .................................................. H04M 3/487
[52] U.S. Cl. ..................................... 379/88.22; 379/88.05; 379/88.06; 379/88.16
[58] Field of Search ............................... 379/67.1, 88.01, 379/88.05, 88.06, 88.08, 88.16, 88.22; 704/270, 275, 258

[56] References Cited

U.S. PATENT DOCUMENTS

| | | | |
|---|---|---|---|
| 4,654,798 | 3/1987 | Taki et al. ................................ | 364/419 |
| 4,785,408 | 11/1988 | Britton et al. ......................... | 364/513.5 |
| 4,922,520 | 5/1990 | Bernard et al. ........................... | 379/88 |
| 4,958,366 | 9/1990 | Hashimoto ................................ | 379/74 |
| 5,133,004 | 7/1992 | Heileman, Jr. et al. .................. | 379/67 |
| 5,138,710 | 8/1992 | Kruesi et al. ........................... | 395/575 |
| 5,193,110 | 3/1993 | Jones ........................................ | 379/94 |
| 5,307,265 | 4/1994 | Winans ............................. | 364/419.01 |
| 5,333,180 | 7/1994 | Brown et al. .............................. | 379/89 |
| 5,367,609 | 11/1994 | Hopper et al. .......................... | 395/2.87 |
| 5,375,164 | 12/1994 | Jennings .................................... | 379/88 |
| 5,388,146 | 2/1995 | Morduch et al. ......................... | 379/52 |
| 5,412,712 | 5/1995 | Jennings .................................... | 379/88 |
| 5,440,615 | 8/1995 | Caccuro et al. ........................... | 379/67 |
| 5,479,488 | 12/1995 | Lennig et al. ............................. | 379/67 |
| 5,488,650 | 1/1996 | Greco et al. .............................. | 379/67 |
| 5,493,606 | 2/1996 | Osder et al. .............................. | 379/67 |
| 5,499,285 | 3/1996 | Morduch .................................. | 379/52 |
| 5,517,561 | 5/1996 | Redden .................................... | 379/142 |

*Primary Examiner*—Scott L. Weaver
*Attorney, Agent, or Firm*—Steven B. Samuels; Mark T. Starr; Rocco L. Adornato

[57] ABSTRACT

A plurality of subsets of prompt definitions associated with a particular language are stored in a memory for access by a system, such as a voice messaging system, that plays prompts according to such prompt definitions during execution of a call flow. Subsets can be created that contain prompt definitions that apply during only parts of the call flow, and different subsets can contain modified forms of the prompt definitions in other subsets. One of the subsets is designated as a base subset. During execution of a call flow, in addition to the base subset, one of the other subsets can be designated as an alternate subset. After that point in the call flow, the system responds to a request to play a particular prompt by first searching the alternate subset to determine whether it contains a prompt definition for the requested prompt, and if so, plays the prompt according to the prompt definition in that alternate subset. If the alternate subset does not contain a prompt definition for the requested prompt, then the system searches the base subset for a prompt definition for the requested prompt and, if found, plays the prompt according to the prompt definition in the base subset. By creating subsets that contain only those prompts that apply during particular parts of a call flow, both memory and disk storage requirements are reduced.

39 Claims, 18 Drawing Sheets

| LANGUAGE ID | SUBSET | SPIN ID |
|---|---|---|
| AE | MAIN | APPAEM |
| AE | SPEECH | APPAES |
| AE | BRIEF | APPAEB |
| AE | USER | APPAEU |
| FR | MAIN | APPFRM |
| FR | SPEECH | APPFRS |
| FR | BRIEF | APPFRB |
| FR | USER | <NOT ASSIGNED> |
| SP | MAIN | APPSPM |
| SP | SPEECH | APPSPS |
| SP | BRIEF | <NOT ASSIGNED> |
| SP | USER | <NOT ASSIGNED> |

*Figure 4*

442
| <VOCABULARY MODULE NAME> (e.g., AMERICAN_ENGLISH) ||
| --- | --- |
| WORD INDEX | WORD |
| 0 | ZERO |
| 1 | ONE |
| 2 | TWO |
| 3 | THREE |
| 4 | FOUR |
| 5 | FIVE |
| 6 | SIX |
| 7 | SEVEN |
| 8 | EIGHT |
| 9 | NINE |
| 10 | REVIEW |
| 11 | DELETE |
| 12 | SAVE |
| 13 | YES |
| 14 | NO |

| <WORD LIST NAME> (e.g., 0001_APPSPCH) (FIRST FOUR DIGITS, e.g. "0001", PROVIDE VOCABULARY INDEX VINX) ||
| --- | --- |
| <VOCABULARY MODULE NAME> (e.g., AMERICAN_ENGLISH) ||
| WORD INDEX | DTMF (HEX) |
| 999 | # |
| 10 | 1 |
| 11 | 2 |
| 12 | 3 |

Figure 9

ENHANCED MULTI-LINGUAL PROMPT MANAGEMENT IN A VOICE MESSAGING SYSTEM WITH SUPPORT FOR SPEECH RECOGNITION

BACKGROUND

1. Field of the Invention

The present invention is directed to systems, such as voice messaging systems, in which prompts are played to users during execution of a call flow, and more particularly, to apparatus and methods for providing enhanced multi-lingual prompt management in such a system, with support for speech recognition.

2. Description of the Prior Art

U.S. Pat. No. 5,133,004, issued Jul. 21, 1992 and assigned to the assignee of the present invention, describes a Network Applications Platform (NAP) commercially available from UNISYS Corporation. The NAP is a configuration of hardware and system software that provides data and voice processing capabilities through applications running on an enterprise server. The NAP provides the interface between these applications, called network applications, and a telephone network. Network applications running on the NAP can provide enhanced services for telephone networks, such as Call Answer, Call Forward, Voice Store and Forward, Voice Mail, Bank By Phone, Emergency Number Facilities, Directory Assistance, Operator Assistance, Call Screening, Automatic Wake-up Services, and the like. In one embodiment, the NAP is implemented on a UNISYS A Series digital computer system. Details of the structure and function of the NAP are provided in U.S. Pat. No. 5,133,004, which is hereby incorporated by reference in its entirety.

A network application, such as a voice mail application, consists of one or more call flows which determine the functionality of the application. A call flow defines how a call is processed from the time it is connected until it is disconnected. It determines how an application will react to various telephony-related events. In particular, a call flow specifies each function or processing step to be executed during a telephone call, the possible results for each function, the decision path to be followed based on the result, and each prompt or voice message to be played during the course of the telephone call.

For example, in a voice mail application, the call flows present certain prompts to a user and allow the user to select certain functions in response. For example, a user might enter the voice mail application and receive a prompt that states "you have <number> new messages." Another prompt might inform the user to "press 1 to review the message, press 2 to save the message, press 3 to delete the message . . . "The user can then make the appropriate choice using the telephone key pad.

A prompt is composed of and defined by a sequence of static and dynamic elements. A static element denotes a fixed phrase, whereas a dynamic element provides a location in the prompt for variable data to be provided by the network application at run time. For example, in the prompt "you have <number> new messages", the phrases "you have" and "new messages" are static elements whereas <number> is a dynamic element to be provided by the network application in accordance with the conditions at run time. The voice for the static elements are recorded in a NAP Voice File and are each assigned a unique Message ID as explained in said U.S. Pat. No. 5,133,004. The Message IDs are provided in a database for reference when it is desired to play a prompt.

A user defines the prompts for a given network application as ordered sequences of specific static elements and dynamic element types. These prompt definitions are stored in records in a database. These records are used by a prompt expansion processor (PEP) in the NAP to expand the prompts for playback in a given network application. A network application invokes the playing of a prompt by issuing a command to the PEP naming the prompt and supplying the specific dynamic data appropriate to the run time condition. The PEP expands the command into the sequence of NAP Message IDs appropriate to play the prompt. The Message IDs are then loaded into a NAP command that is executed by the NAP to play back the actual recorded voice elements stored in the NAP Voice File.

U.S. Pat. No. 5,493,606, issued Feb. 20, 1996 and also assigned to the assignee of the present invention, describes an enhanced prompt management system for NAP that provides multi-lingual capability for the prompts of a network application without the necessity of significant network application programming changes or modification to the PEP. The prompt management system described therein comprises a Speech Interface to NAP (SPIN) in combination with the Prompt Expansion Processor (PEP) with a Modular Dynamic Data Processor (MDDP). The system is referred to as SPIN/PEP. SPIN is a program used through NAP on behalf of a network application to create or modify the prompts and the elements of the prompts to be played by the network application in a predetermined spoken language. The elements of the prompts are ordered in accordance with the syntax, grammar and phraseology of the particular spoken language. The voice for the elements can be recorded through NAP and stored in the NAP Voice File. The NAP Message IDs corresponding to the recorded voice elements are stored in a SPIN Data Base (SPINDB). The SPIN user creates or modifies a Dynamic Element Table containing ordered lists of logically grouped dynamic elements required for the prompts of the network application. The MDDP defines the order and manner in which dynamic data within a dynamic element is spoken in accordance with the syntax, grammar and phraseology of the particular spoken language. The created or modified prompt, element voice, Dynamic Element Table and MDDP information set for a spoken language is denoted as a SPIN application for the particular spoken language. The SPIN user can copy and modify an existing SPIN application for one spoken language to provide another SPIN application for another spoken language. The SPIN application is created or modified by the user utilizing interactive SPIN screens. SPIN runs on the same UNISYS A Series computer on which the NAP is implemented.

The network application issues a PEP command to send a prompt, e.g., an Enhanced Send Prompt (ESP) command or an Enhanced Multi-Send Prompt (EMSP) command, to PEP for expansion, the command designating the ID of the SPIN application to be utilized, the prompt to be played and the specific dynamic data to be utilized. The PEP, using the designated SPIN application information, expands the prompt into its static and dynamic elements converting the static elements into the corresponding NAP Message IDs. The dynamic data is sent to the MDDP which in combination with the Dynamic Element Table expands the dynamic elements into the corresponding NAP Message IDs. The PEP returns an ordered list of the NAP Message IDs which are used in a NAP Send Voice Message command to play the prompt over the telephone. The prompt management system of U.S. Pat. No. 5,493,606 thus permits a network application to play a designated prompt in a selectable spoken language without altering the functional code of the network application nor the operation code of the underlying PEP. The network applications share the same PEP.

It would be advantageous for a network application developer to be able to define subsets of prompts associated with a particular language within a single network application, where each subset contains only those prompts that apply during a particular part of a call flow. Additionally, different subsets could present modified forms of certain prompts, so that slightly different versions of certain prompts could be played at a particular point in a call flow depending upon the circumstances. For example, one call state in a call flow may specify that a prompt is to be played that says "Press '1' on your key pad to review your messages." It would be desirable to be able to play alternate prompts at that call state, depending upon the circumstances of the call. For example, in a system that supports speech recognition, if that capability were enabled, it might be necessary to instead play a prompt at that point that says "To review your messages, say 'REVIEW'". Another situation in which it might be desirable to play a modified form of prompt at a particular call state is when the user of the network application is familiar enough with the application that the prompts can be abbreviated. In the example above, an abbreviated prompt at that same point in the call flow might say "Press 1 to review." The user doesn't need any more information and is likely to appreciate the brevity of the prompt.

At present, the prior art does not teach any efficient way to provide the above capabilities. In the prior art, in order to provide modified forms of certain prompts at certain portions of a call flow, the network application developer either must provide a complete set of prompts for each circumstance (e.g., speech recognition, abbreviated prompts, etc.), even though many prompts would not need to be changed, or must create a completely different call flow and/or network application to provide the capability. Accordingly, there is a need for an efficient way to provide network application developers with the ability to play modified forms of certain prompts at different points of a call flow, without requiring any reprogramming or other modifications to the call flow. The present invention satisfies this need.

SUMMARY OF THE INVENTION

The present invention is directed to methods and apparatus for providing enhanced prompt management in a telephony-based system, such as a voice messaging system. The present invention improves upon the prior art by providing network application developers with the ability to play modified forms of certain prompts at different points of a call flow, without requiring any reprogramming or other modifications to the call flow. Another advantage of the present invention is that it reduces the storage requirements needed to store prompt definitions in the system.

According to a preferred embodiment of the present invention, a plurality of subsets of prompt definitions associated with a particular language are stored in a memory for access by a system, such as a voice messaging system, that plays prompts according to such prompt definitions during execution of a call flow. Each subset contains prompt definitions for prompts to be played during a part of the call flow. One of the subsets is designated as a base subset. During execution of the call flow, in addition to the base subset, one of the other subsets can be designated as an alternate subset. After that point in the call flow, the system responds to a request to play a particular prompt by first searching the alternate subset to determine whether it contains a prompt definition for the requested prompt, and if so, plays the prompt according to the prompt definition in that alternate subset, but if the alternate subset does not contain a prompt definition for the requested prompt, then the system searches the base subset for a prompt definition for the requested prompt and, if found, plays the prompt according to the prompt definition in the base subset.

At least part of the present invention is embodied in one or more computer programs that provide the ability to create the different subsets of prompts associated with a particular language for use by the system. These programs may take the form of program code embodied in tangible media, such as floppy diskettes, CD-ROMs, hard drives, or any other machine-readable storage medium, wherein, when the program code is loaded into and executed by a computer, the computer performs the steps of creating a plurality of subsets of prompt definitions associated with a particular language, each subset containing prompt definitions for prompts to be played during a call flow, designating one of the subsets as a base subset, and storing the plurality of subsets of prompt definitions in a database for access by the system during execution of a call flow. Subsets can be created that contain prompt definitions to be used during only parts of the call flow. Also, different subsets can contain modified forms of certain prompts, so that different variations of certain prompts can be played at various points in the call flow, without requiring any change to the underlying call flow or network application code. By creating subsets that contain only those prompts that apply during a particular part of a call flow, both memory and disk storage requirements can be reduced.

According to still other aspects of the present invention, methods and apparatus are provided for performing speech recognition in conjunction with the playing of prompts. A vendor-supplied vocabulary module contains one or more vocabularies against which received voice may be compared. A vocabulary is a pre-defined subset of the words available within a vocabulary module. According to the present invention, a network application developer creates a vocabulary list containing an entry for each word in the vocabulary module that specifies a word index for that word within the vocabulary module. The developer then creates a word list for each vocabulary. Each word list provides a mapping between each word of the vocabulary and a DTMF digit to be returned by the system upon recognition of that word. The word list information is processed by the system when a speech recognition request is made.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 4 illustrates the contents and structure of an exemplary language table generated in accordance with the preferred embodiment of the present invention;

FIG. 8 illustrates the contents of an exemplary vocabulary list in accordance with the present invention;

FIG. 9 illustrates the contents of an exemplary word list in accordance with the present invention;

DETAILED DESCRIPTION OF THE PREFERRED EMBODIMENT

Figure 1:
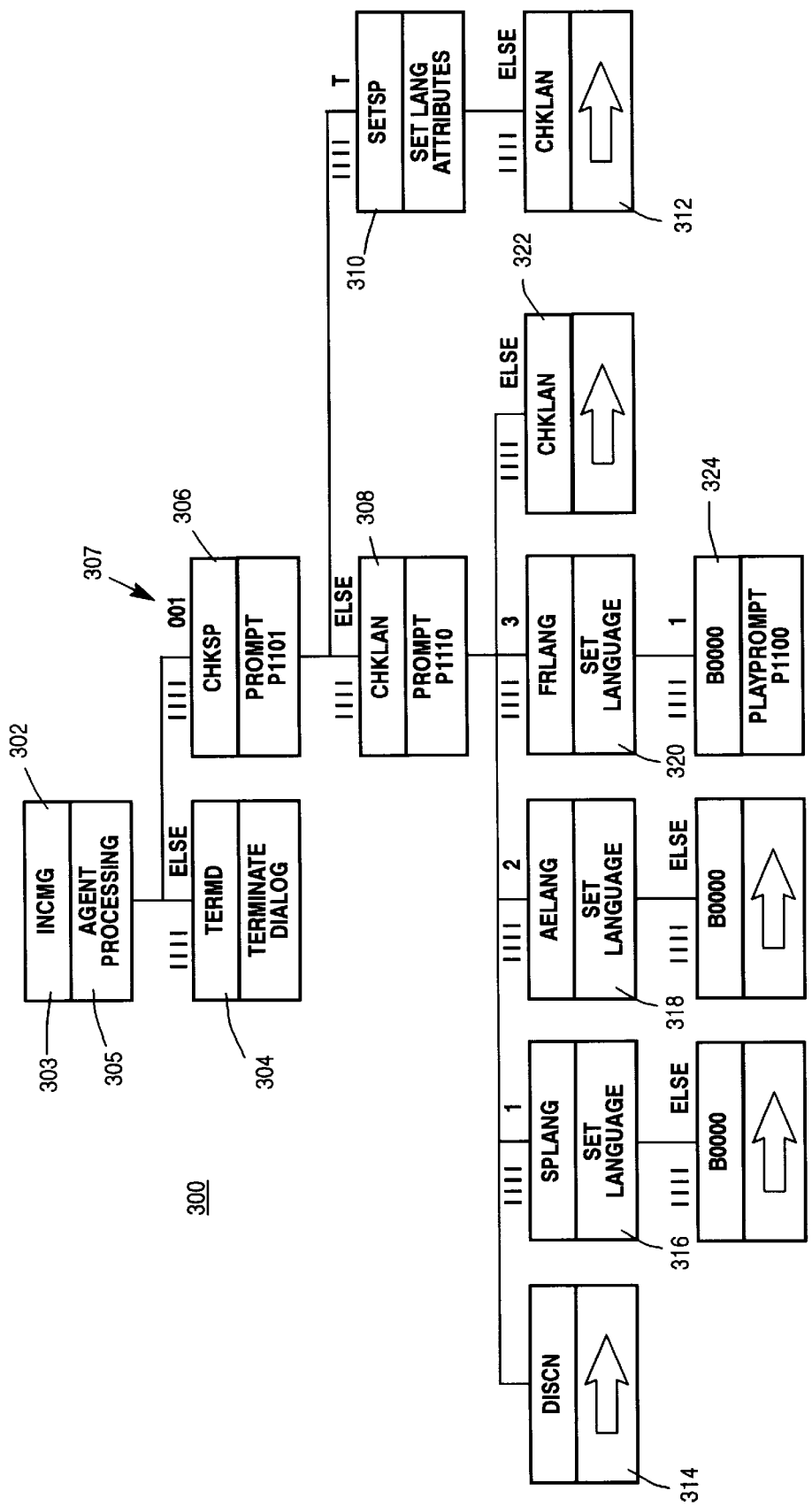
FIG. 1 graphically illustrates an exemplary call flow of a network application.

Referring to the drawings, wherein like numerals represent like elements throughout, the present invention is directed to methods and apparatus that provide enhanced prompt management in a telephony-based system. According to one aspect of the present invention, methods and apparatus are provided that enable a network application developer to define subsets of prompts associated with a particular language for use by a network application during execution of a call flow. Subsets can be created that contain only those prompts that apply during particular parts of the call flow. Also, different subsets can contain modified forms of certain prompts, so that different variations of certain prompts can be played at various points in the call flow, without requiring any change to the underlying call flow or network application code. The present invention thus improves upon the prompt management system described in commonly assigned U.S. Pat. No. 5,493,606, which is hereby incorporated by reference in its entirety.

According to a preferred embodiment of the present invention, the methods and apparatus of the present invention are implemented on and/or form part of a system that executes telephony-based applications, referred to herein as network applications, to provide telephony-related services to callers. In the preferred embodiment, the methods and apparatus of the present invention are implemented on and/or form part of a Network Application Platform (NAP), such as that described in commonly assigned U.S. Pat. No. 5,133,004, which is incorporated herein by reference in its entirety. As described above, the NAP is a configuration of hardware and system software that provides data and voice processing capabilities through network applications running on an enterprise server. In one embodiment, the NAP is implemented on a UNISYS A Series digital computer system. It is understood, however, that while the methods and apparatus of the present invention are described in the preferred embodiment as being implemented on and/or as part of the NAP system, they are by no means limited to implementation thereon, but rather may be implemented or employed in connection with any system providing the ability to execute network applications.

Further in accordance with the present invention, the methods and apparatus may be embodied, at least in part, in one or more personal computer (PC) based programs. In the preferred embodiment, the methods and apparatus of the present invention are embodied, at least in part, in two PC-based programs referred to herein as PC SPIN (Speech Interface to NAP) and PC NAPTool. PC SPIN is a modified form of the SPIN program described in commonly assigned U.S. Pat. No. 5,493,606, and is used by an application developer to create and modify sets of prompt definitions and related information required to expand and play prompts on the system. PC NAPTool is used by a network application developer to create and edit the call flows of a network application. In the preferred embodiment, the PC SPIN and PC NAPTool programs run in the Microsoft Windows environment.

As described hereinafter in greater detail, in accordance with one aspect of the present invention, PC SPIN and PC NAPTool allow a user to create a plurality of subsets of prompt definitions and to associate them with a particular language, each subset containing prompt definitions for prompts to be played during execution of a call flow. Subsets can be created that contain prompt definitions for prompts to be played during only certain parts of the call flow. Also, different subsets can contain modified forms of certain prompts, so that different variations of certain prompts can be played at various points in the call flow, without requiring any change to the underlying call flow or network application code. One of the subsets of prompt definitions associated with the particular language is designated as a base subset. Once created, the plurality of subsets of prompt definitions are stored as part of a database for access during execution of a network application by a telephony-based system, such as, in the preferred embodiment, a NAP.

The aspects of the methods and apparatus of the present invention that are embodied in the PC SPIN and PC NAPTool programs may take the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. These aspects of the present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code combines with the processor to provide a unique device that operates analogously to specific logic circuits.

Definitions

A network application is an application that executes on a telephony-based system, such as the NAP, to provide telephony-related services, such as Call Answer, Call Forward, Voice Store and Forward, Voice Mail, Bank By Phone, Emergency Number Facilities, Directory Assistance, Operator Assistance, Call Screening, Automatic Wake-up Services, and the like. A network application comprises one or more call flows.

A call flow defines how a call is processed from the time it is connected until it is disconnected. It determines how a network application will react to various telephony-related events. In particular, a call flow specifies each function or processing step to be executed during a telephone call, the possible results for each function, the decision path to be followed based on the result, and each prompt or voice message to be played during the course of the telephone call. A call flow is comprised of a sequence of call states. As used herein, the phrase "to play a prompt" and variations thereof means to output the digitized voice of a prompt over a telephone connection or the like so that it can be heard by a caller.

A call state is one state, or point, in a call flow. At any given time, each call coming into a network application has a finite call state. At a given call state, a given function is performed and the results of the function point either to a next state, or to an exit state. The function can lead to one or many results.

Referring to FIG. 1, a portion of an exemplary call flow 300 generated using the PC NAPTool program is shown. Each box 302–324 in FIG. 1 represents one call state. Box 302 is the first, or initial call state, upon entry into the call flow. This call state is pre-defined in PC NAPTool. PC NAPTool automatically assigns this as the initial call state when a call flow is created. It performs automatic processing for an incoming call. Each call state box shown in FIG. 1 (e.g., boxes 302–324) identifies a name for the call state (e.g., INCMG, TERMD, CHKSP, CHKLAN, SET SP, B000, etc.) and the function performed at the call state. For example, the portion 303 of the initial call state 302 lists the name of that state ("INCMG"), and the portion 305 identifies the function performed at that state ("Agent Processing"). In the example shown, if initial processing of the call is successful, a value of "001" will be returned (as indicated at 307), and the call flow will proceed to the next call state 306 ("CHKSP"). If the value of "001" is not returned, the call flow will enter call state 304 ("TERMD"), at which the Terminate Dialog function will be executed to terminate the present call.

It should be noted that the INCMG call state can be used to identify and respond to different call types. Each call type may return a different value (e.g., "001," "002," "003," etc.) that can lead to a different next state. For example, a call type "001" could be defined to route incoming calls to voice mail call flows, while call type "002" could route calls to call flows for call answering. The different call types can be specified for a new application using PC NAPTool. Call types specified in PC NAPTool must also be defined to the NAP when the application is installed on the A Series NAP platform. In the example of FIG. 1, there is only one call type defined and it returns a value of "001."

At call state 306, the function to be executed is the "Play Prompt" function, and the prompt to be played has an identification code (ID) of "P1101." In this example, prompt "P1101" will play the following voice message to the user: "If you have a touch tone phone, press 1." The remaining call states 308–324 define further functionality of the call flow. Reference to the exemplary call flow of FIG. 1 will be made hereinafter to explain other features and aspects of the present invention.

Figure 2:
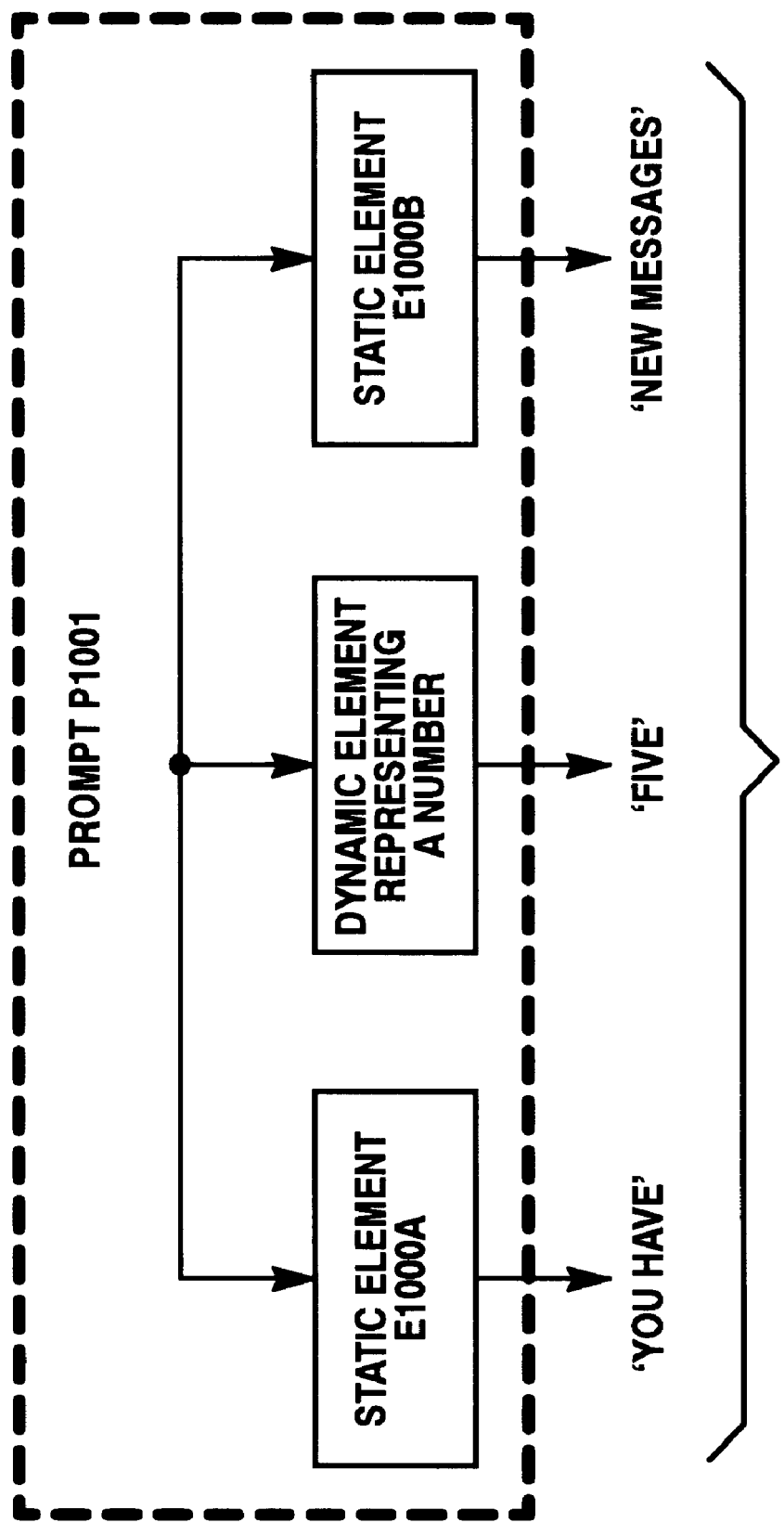
FIG. 2 is a diagram schematically illustrating the anatomy of a prompt.

FIG. 2 illustrates the anatomy of an exemplary prompt definition having an identification code P1001 assigned thereto. The prompt is comprised of a static element, identified as E1000A, which has the voice "you have", followed by a dynamic element of dynamic element type 3 representing a number, followed by a static element E1000B with voice "new messages". The prompt definition for this prompt is P1001=E1000A, <DYN3>, E1000B. A prompt definition thus specifies an ordered sequence of specific static elements and dynamic element types that make up the prompt. In accordance with the present invention, the prompt definition P1001 was created using PC SPIN. As described hereinafter in greater detail, a network application invokes playing of a prompt by issuing a command identifying the prompt by its identification code, e.g., P1001, and by providing the appropriate dynamic data applicable at run time. The preferred embodiment of the invention supports nine standard dynamic element types as follows: DYN0= Message ID; DYN1=Time/Date; DYN2=Text Locator; DYN3=Cardinal Number; DYN4=Digit String; DYN5= Phone Number; DYN6=Money; DYN7=Alphanumeric; DYN8=Element Name. Dynamic element types 0, 2 and 8 are processed by an internal Dynamic Data Processor within a Prompt Expansion Processor (PEP) and the dynamic element types 1, and 3–7 are managed by an external Modular Dynamic Data Processor (MDDP) in the manner described in commonly assigned U.S. Pat. No. 5,493,606. The preferred embodiment also supports user-defined dynamic element types denoted as DYN100–DYN999 which requires a custom MDDP, as also described in the '606 patent.

Languages and Language Subsets

According to one aspect of the present invention, a method of creating prompt definitions for use by a network application during execution of a call flow comprises the steps of creating a plurality of subsets of prompt definitions associated with a particular language, wherein each subset contains prompt definitions for prompts to be played during execution of the call flow, designating one of the subsets of prompt definitions associated with the particular language as a base subset, and storing the plurality of subsets in a database for access during execution of a call flow of a network application. Subsets can be created that contain prompt definitions for prompts to be played during only certain parts of the call flow. Also, different subsets can contain modified forms of certain prompts, so that different variations of certain prompts can be played at various points in the call flow, without requiring any change to the underlying call flow or network application code.

In the preferred embodiment, four subsets of prompt definitions can be created for a particular language. These four subsets are designated MAIN, SPEECH, BRIEF, and USER, respectively. The subset designated MAIN is pre-defined as the base or default subset. This subset preferably contains a complete set of prompts for a network application, i.e., the subset contains at least one prompt for every call state that performs a "play prompt" function. If necessary, the network application could function using only this subset. Although the SPEECH, BRIEF and USER subsets can be used for any purpose, the SPEECH subset preferably contains those prompts that request a spoken response from a caller, and the BRIEF subset preferably contains abbreviated versions of certain prompts of the base subset. The USER subset may be used for any purpose; there is no suggested use as there is with the SPEECH and BRIEF subsets. While up to four subsets may be created for each language in the preferred embodiment, a network application developer need not create all four subsets for a given language. For example, a developer may only need to create the base subset and a SPEECH subset. Moreover, in other embodiments of the present invention, more than four subsets could be created for a particular language.

Further according to the present invention, each subset of prompts for a particular language is part of its own SPIN application. As described in commonly assigned U.S. Pat. No. 5,493,606, a SPIN application is a collection of prompts and elements along with a Dynamic Element Table, an Indexed Prompt Table, and an associated MDDP for processing and playing prompts during execution of a network application. Each SPIN application is assigned a unique identification code referred to herein as a SPIN ID. In accordance with the present invention, each subset of prompts created for a particular language is associated with the SPIN ID of the SPIN application of which it is a part. Additionally, each subset is associated with a language identifier that identifies the particular language for which the subset was created. A network application uses SPIN applications to play the voice prompts of the network application. In the present embodiment, SPIN applications are created by the developer of a network application using the PC SPIN program. A single network application can access multiple SPIN applications and multiple network applications can access the same SPIN application.

Figure 3:
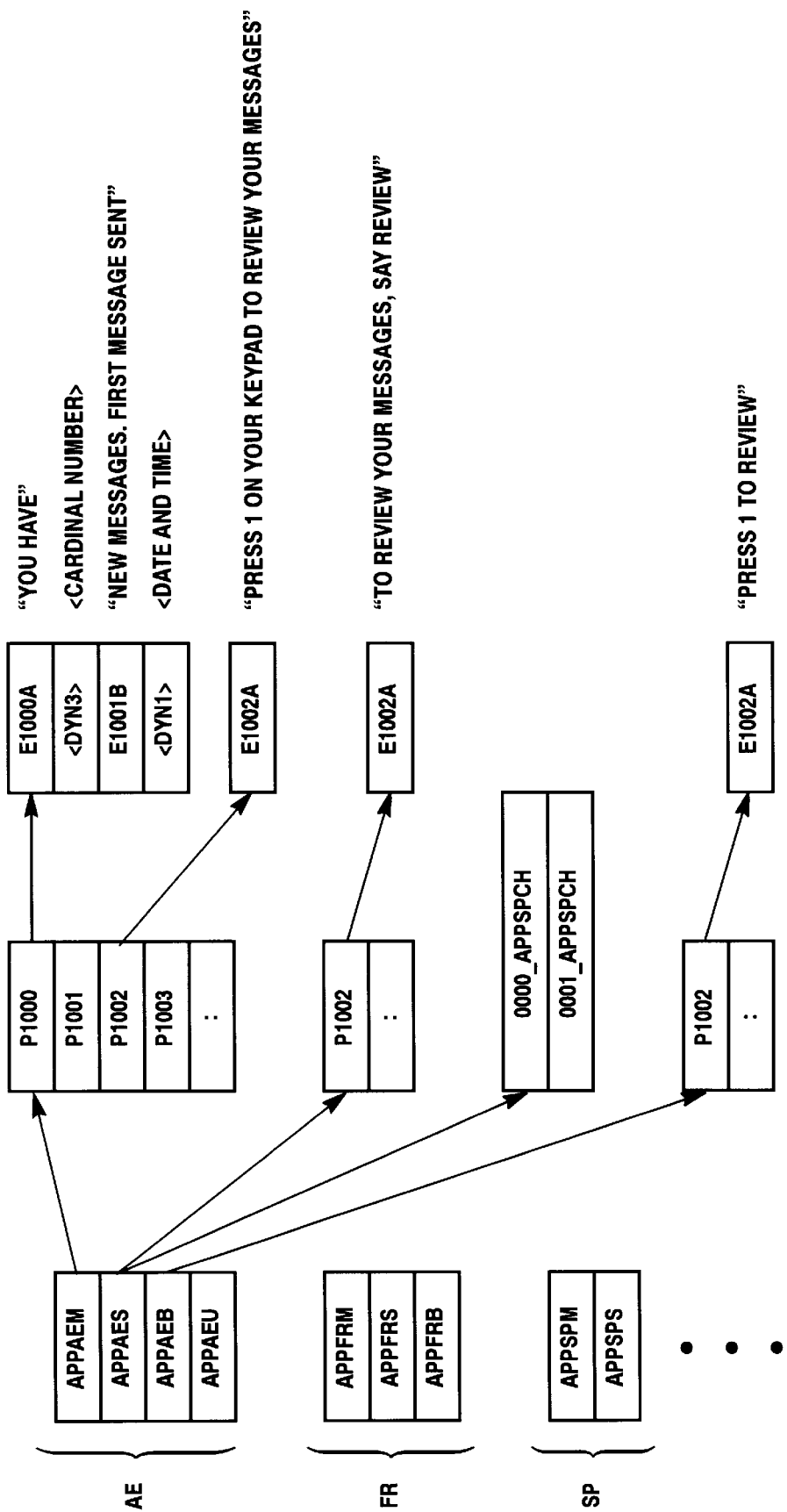
FIG. 3 is a diagram schematically illustrating the creation of a plurality of subsets of prompt definitions for each of a plurality of languages in accordance with a preferred embodiment of the present invention.

FIG. 3 provides an illustration of the preferred embodiment of these aspects of the present invention. In the example shown, four subsets of prompt definitions have been created for the American-English language. The language identifier for this language is "AE." The base subset (MAIN) of prompt definitions has been assigned a SPIN ID of "APPAEM," the SPEECH subset has been assigned a SPIN ID of "APPAES," the BRIEF subset has been assigned a SPIN ID of "APPAEB," and the USER subset has been assigned a SPIN ID of "APPAEU." As mentioned above, these SPIN IDs are used to associate each subset of prompt definitions with the SPIN application of which it is a part.

In the example shown, the base subset APPAEM contains a group of prompt definitions, each having its own prompt identifier ("prompt ID") (e.g., P1000, P1001, P1002, P1003 . . . ). Prompt P1000 is comprised of a static element, E1000A, followed by a dynamic element of type DYN 3, a static element E1001B, and another dynamic element of type DYN 1. This prompt would play the following voice message "You have <cardinal number> new messages. First message sent <date and time>." Prompt P1002 is comprised of a single static element, E1002A, and would play the message "Press 1 on your keypad to review your messages."

The SPEECH subset APPAES created for the American_ English language (language ID=AE) contains only those prompts that are played when speech recognition (described hereinafter) is enabled. This subset typically will contain versions of certain of the prompts of the base subset APPAEM that are modified for speech recognition. For example, prompt definition P1002 of subset APPAES, which corresponds to prompt definition P1002 of the base subset APPAEM, is a modified version of that prompt. The prompt definition P1002 in subset APPAES would cause the following message to be played: "To review your messages, say 'review'". For reasons which will become evident hereinafter, it is preferable that the prompt definitions of a given subset that correspond to prompt definitions in the base subset, have the same prompt IDs as their counterparts in the base subset. In this example, both of the prompt definitions have a prompt ID=P1002. This applies also to corresponding element designations (see, e.g., element E1002A). Similarly, it is preferable that prompt definitions in one language that correspond to prompt definitions in other languages also have the same prompt IDs. As described hereinafter in greater detail, the SPIN application containing the SPEECH subset of prompts may also include one or more word lists (e.g., 0000_APPSPCH, 0001_ APPSPCH, etc.) that provide information concerning the words to be recognized during a speech recognition attempt.

Similar to the SPEECH subset, the BRIEF subset APPAEB contains only those prompts that are played when it is desired to present abbreviated prompts to a user. For example, prompt definition P1002 of subset APPAEB, which again corresponds to prompt definition P1002 of the base subset APPAEM, is a modified version that conveys the same information in an abbreviated format—"Press 1 to review." Again, the corresponding prompt definitions in each subset have the same prompt ID.

As further depicted in FIG. 3, other subsets of prompts may be generated for other languages. For example, as shown in FIG. 3, three subsets have been created for the French language, a MAIN subset (the base subset), a SPEECH subset, and a BRIEF subset (the prompt definitions of each subset are not shown). The language identifier for the French language is "FR," and the SPIN IDs assigned to the three subsets are APPFRM, APPFRS, and APPFRB, respectively. Similarly, two subsets—a MAIN subset and a SPEECH subset—have been generated for the Spanish language, which has a language identifier of "SP". The SPIN IDs assigned to these subsets are APPSPM and APPSPS. A user can create subsets of prompts for any number of different languages. As can be appreciated, the French language subsets and the Spanish language subsets would contain prompt definitions that correspond to the prompt definitions in the American-English subsets, but which play those corresponding prompts in French or Spanish.

In the preferred embodiment, the PC SPIN program is used to create each subset of prompt definitions. Prompts are created in a similar manner to that described in commonly assigned U.S. Pat. No. 5,493,606. Once the subsets of prompt definitions are created, an application developer can use PC NAPTool to associate each subset with its language identifier and with its SPIN application identifier (SPIN ID). In the preferred embodiment, PC NAPTool creates a language table of the type illustrated in FIG. 4. FIG. 4 shows an example of a language table 330 that would be created for the various subsets illustrated in FIG. 3. The table contains three columns. The first column 332 specifies the language identifier for each subset. The second column 334 specifies the particular type of subset (e.g., MAIN, SPEECH, BRIEF, or USER), and the third column 336 specifies the SPIN ID assigned to each subset. As described hereinafter, during execution of a network application call flow, this table is accessed in order to specify the currently active subset(s) from which prompts are to be played. In the example shown, there is no SPIN ID for the French language USER subset, nor are there SPIN IDs for the Spanish language BRIEF and USER subsets, since, as shown in the example of FIG. 3, these subset types were not created for the French and Spanish languages.

Further according to the present invention, the subsets of prompts created for each language are stored in a SPIN application database (SPINDB) along with other SPIN application-related information. A network application developer uses the PC SPIN program to create a SPIN application for each subset of prompt definitions, and uses the PC NAPTool program to create call flows for a network application that reference the information in the various SPIN applications. Once created, the network application developer transfers the SPIN applications (created with PC SPIN) and network application call flows and related information (e.g., the language table) (created with PC NAPTool) from the PC-based platform to the UNISYS A Series digital computer system on which the NAP is implemented. An Installation Manager program takes the transferred information and installs it in appropriate files on the A Series computer for use during execution of a network application. For example, the Installation Manager coordinates transfer of the information comprising each SPIN application into the SPIN database.

Figure 5:
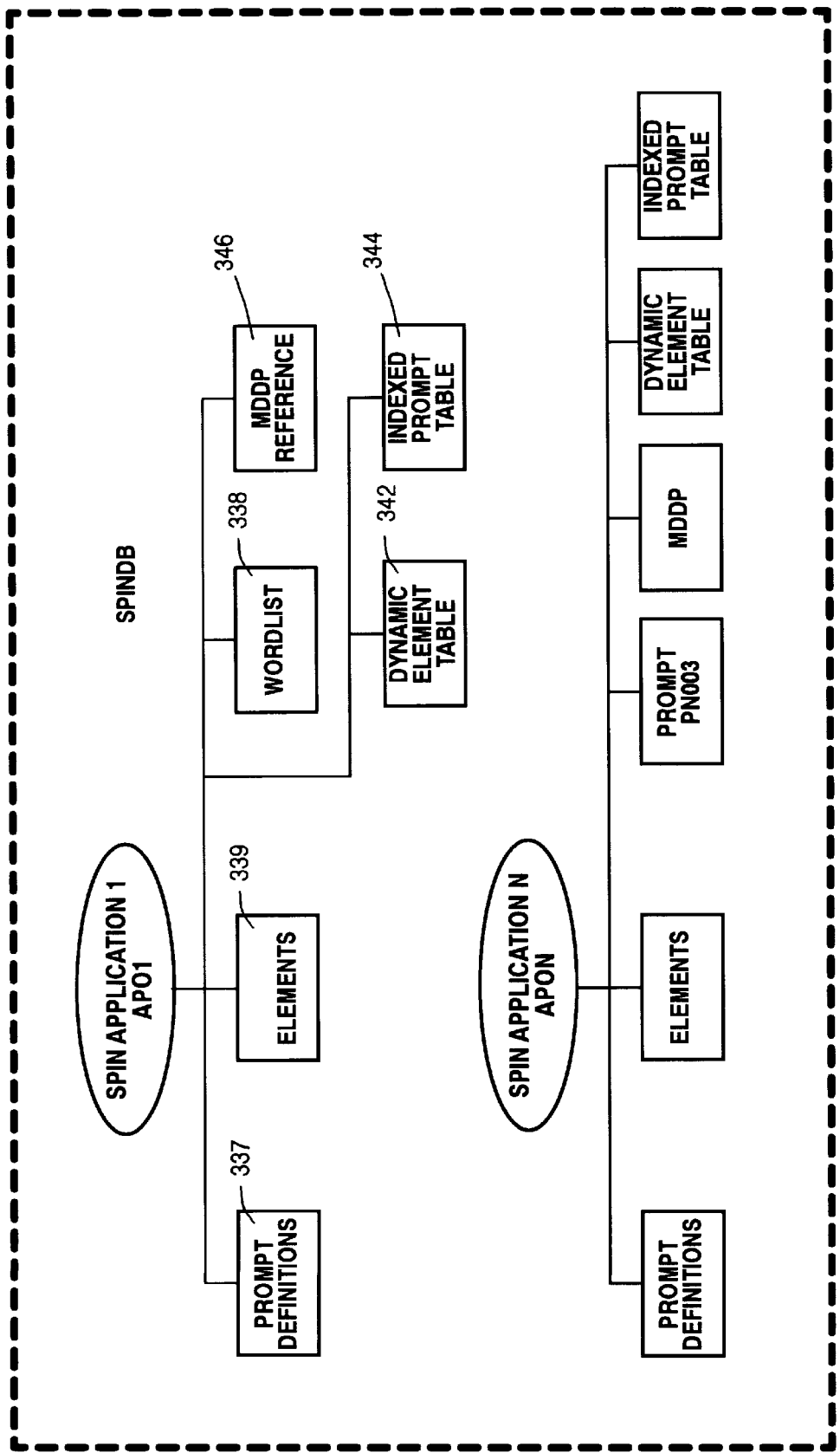
FIG. 5 is a diagram schematically illustrating the organization and contents of SPIN applications within the SPINDB in accordance with the present invention.

FIG. 5 illustrates the organization of SPIN applications within the SPIN database (SPINDB). Each SPIN application, e.g., SPIN application "AP01" in FIG. 5, contains a subset of prompt definitions 337, information 339 relating to the elements that make up each prompt definition, a Dynamic Element Table 342 that contains the names of dynamic elements needed to expand and play dynamic data, an Indexed Prompt Table 344 that contains the most frequently used prompts for the application, and a reference 346 to a Modular Dynamic Data Processor (MDDP) on the NAP that will process dynamic data for the application. The contents and function of the Dynamic Element Table, Indexed Prompt Table, and the MDDP, and how they are employed during the expansion and playback of a prompt are described in detail in commonly assigned U.S. Pat. No. 5,493,606. A SPIN application may also contain one or more word lists 338 for use in connection with the speech recognition features of the present invention, which are described hereinafter.

Figure 6A:
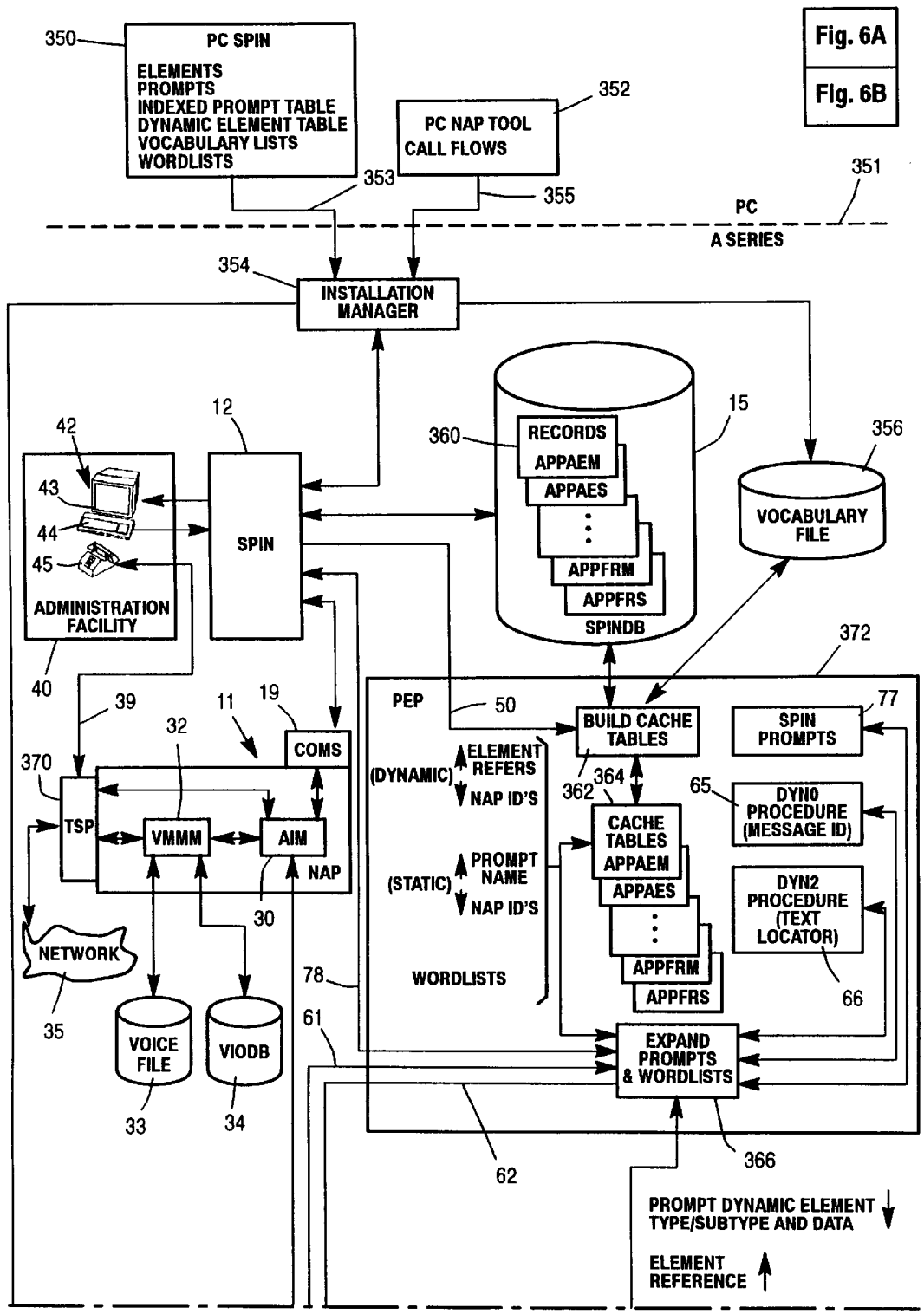
FIGS. 6A–6B are a block diagram illustrating a preferred embodiment of a system and apparatus for carrying out aspects of the methods of the present invention.
Figure 6B:
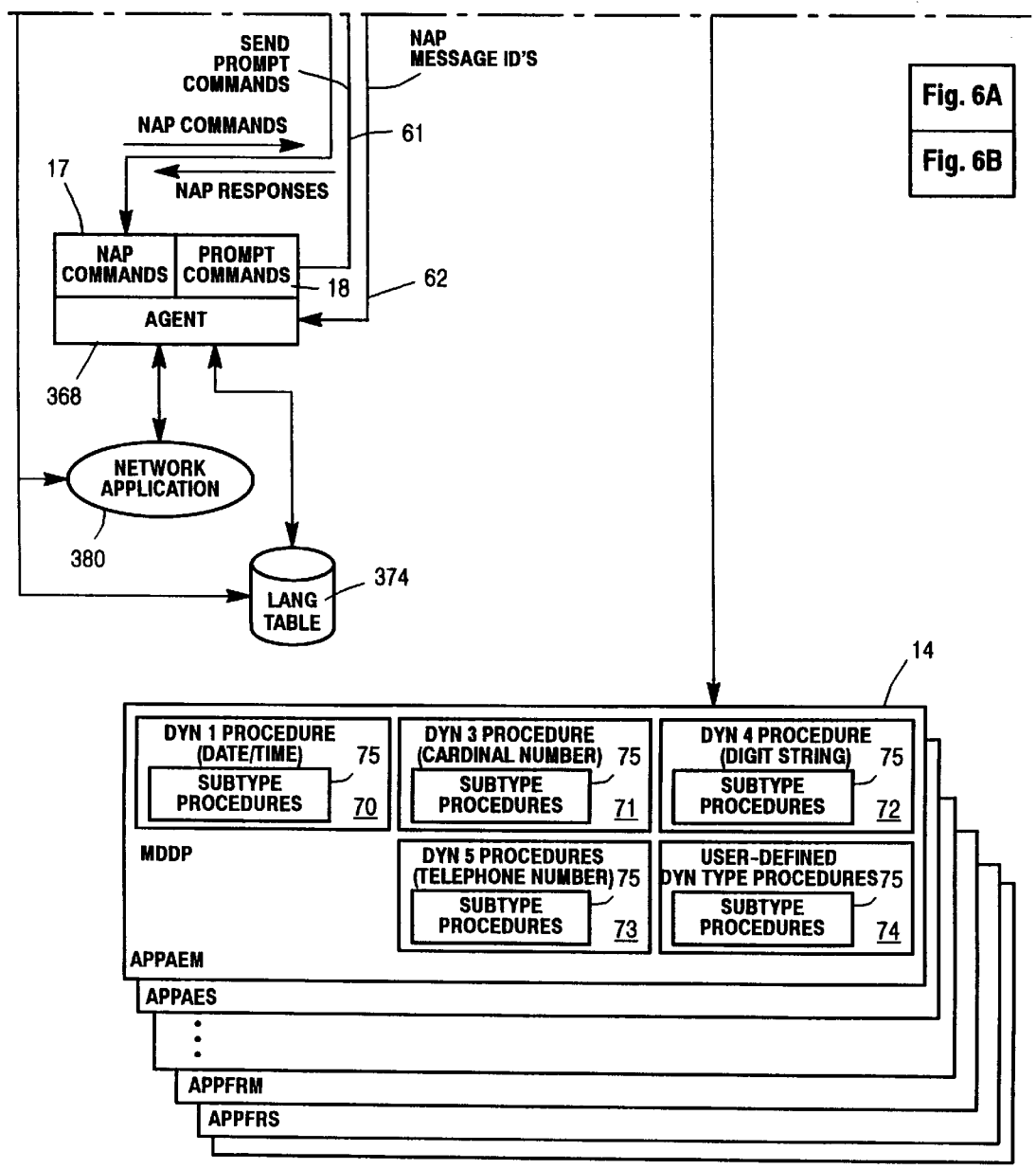

FIGS. 6A and 6B show a block diagram illustrating a preferred embodiment of apparatus comprising a system for carrying out aspects of the methods of the present invention. The system of FIGS. 6A–B is similar to the system illustrated in commonly assigned U.S. Pat. No. 5,493,606, but has been modified therefrom in accordance with the present invention. In particular, PC-based programs, PC SPIN 350 and PC NAPTool 352, are now used to create the subsets of prompt definitions for each particular language and to generate call flows for network applications to take advantage of the features of the present invention. A dashed line 351 is shown in FIG. 6A to indicate which elements of the system are implemented on a personal computer (PC) or workstation (in this embodiment PC SPIN 350 and PC NAPTool 352) and which are implemented on a UNISYS A Series digital computer system (the remaining elements).

In the present embodiment, a network application developer uses PC SPIN 350 to create prompts, elements, a Dynamic Element Table, an Indexed Prompt Table, vocabulary lists and word lists for each language subset (e.g., MAIN, SPEECH, BRIEF, or USER). The collection of prompts, elements, Dynamic Element Table, Indexed Prompt Table, vocabulary lists and word lists for a given language subset defines a SPIN application. In the present embodiment, the PC SPIN program 350 presents the network application developer with various screens (not shown) to create the prompts, elements, Dynamic Element Table, Indexed Prompt Table, vocabulary lists and word lists of a given SPIN application. The screens used to create the prompt definitions, elements, Dynamic Element Table, and Indexed Prompt Table are functionally similar to the Prompt Processing screen, Element Processing screen, Modify Items For Prompt screen, Indexed Prompt Table screen, and Dynamic Element Table screen provided by the SPIN 12 program described in said U.S. Pat. No. 5,493,606, except that they provide entry and presentation of information using the graphical user interface features of the Microsoft Windows environment. The prompt definitions, elements, Dynamic Element Table, and Indexed Prompt Table created by PC SPIN are functionally the same as those created using the SPIN 12 program described in said U.S. Pat. No. 5,493,606, and further details of these items are described therein. When the network application developer has finished creating the SPIN applications for a given network application, the PC SPIN program 350 provides the capability to transfer the SPIN application information to the UNISYS A Series digital computer system via a path 353.

Figure 14:
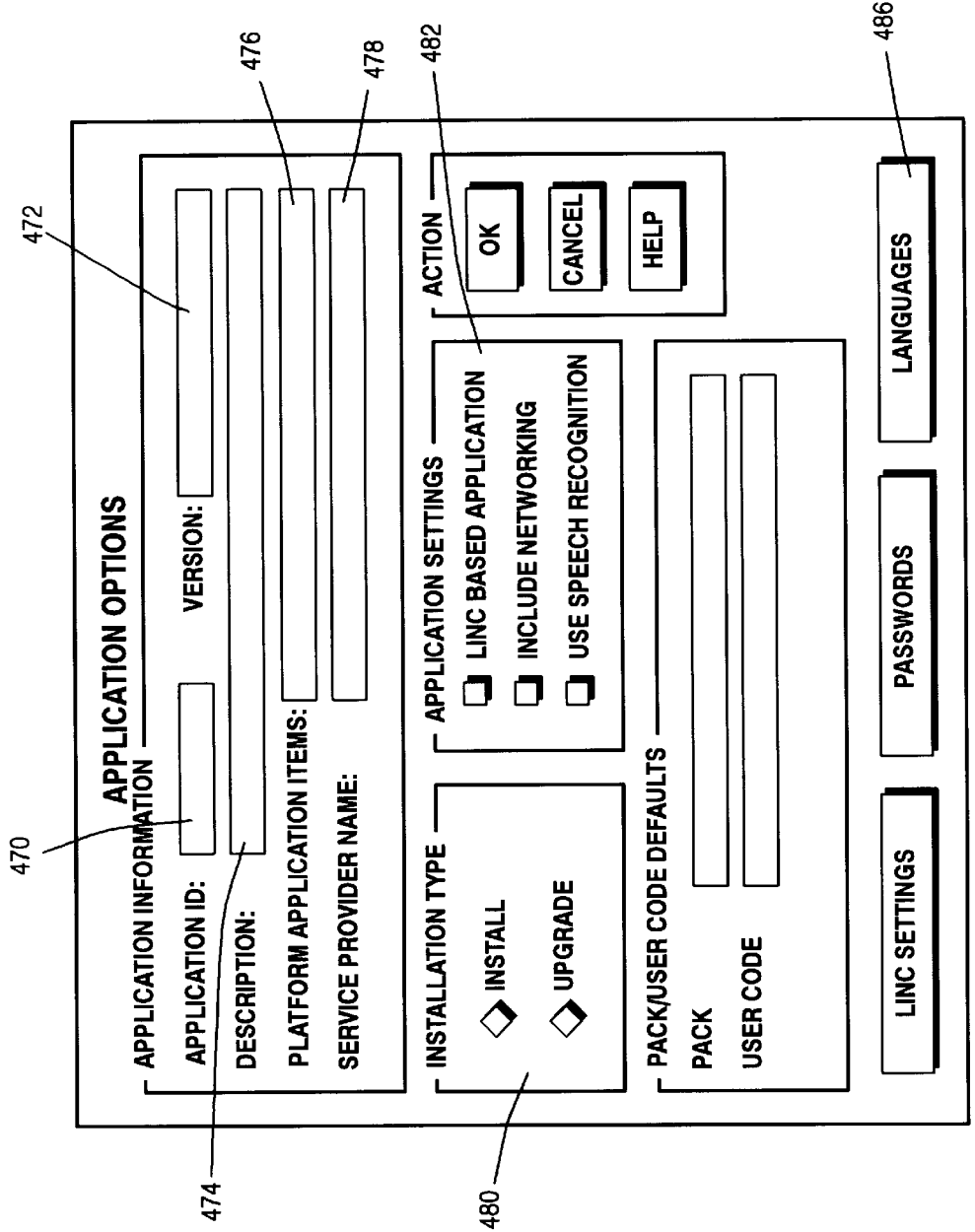
FIG. 14 shows an Application Options dialog box of the PC NAPTool program that allows a network application developer to specify global parameters for installing a given network application.
Figure 15:
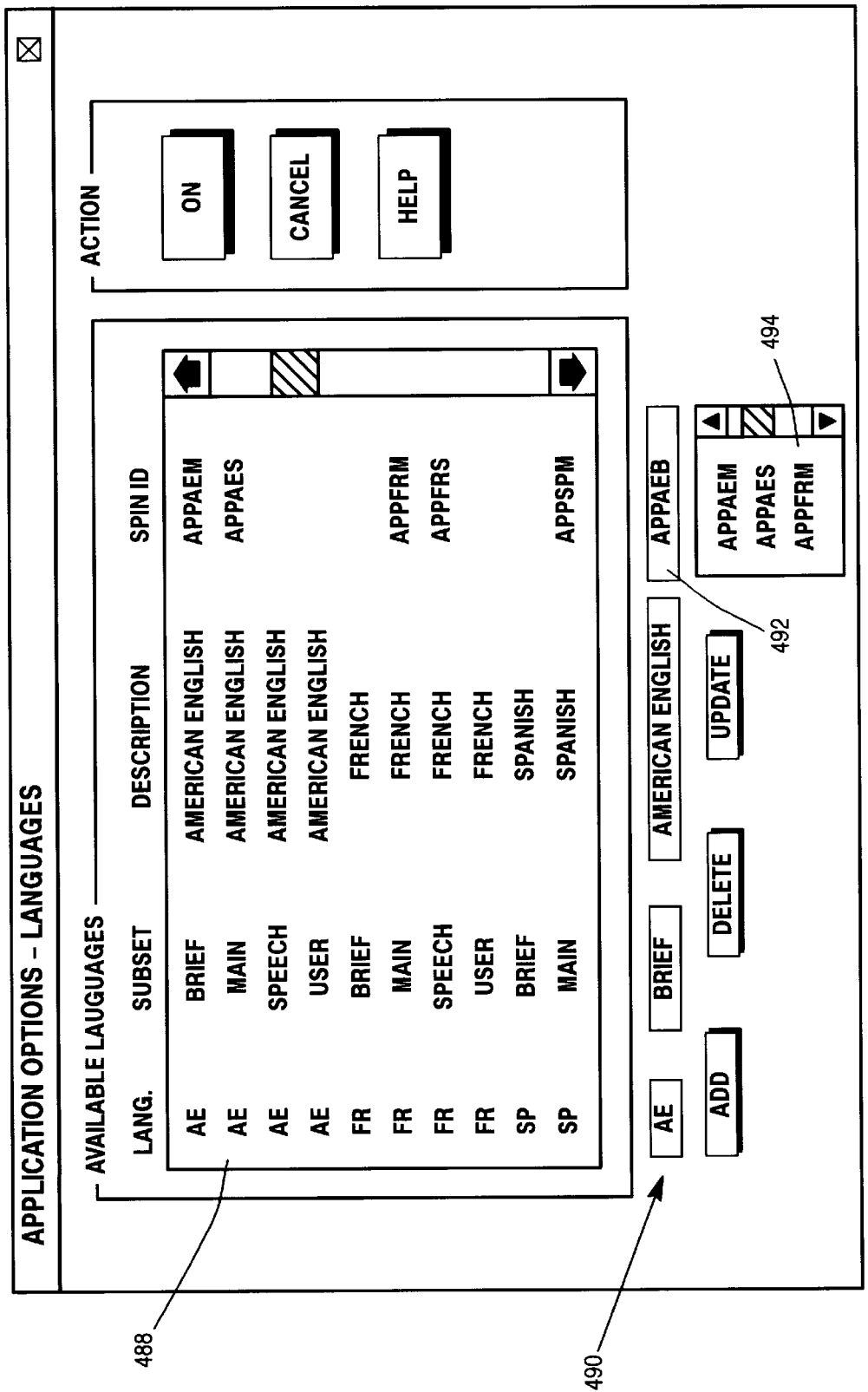
FIG. 15 shows an Application Options-Languages dialog box of the PC NAPTool program that is used to create a language table in accordance with the present invention.

Further according to the preferred embodiment of the present invention, the network application developer uses the PC NAPTool program 352 to create call flows and related information for a network application. Like PC SPIN 350, PC NAPTool 352 is a Microsoft Windows-based application that runs on a personal computer or workstation. Using a graphical user interface, the network application developer defines each call state of a call flow and the decision paths between them. FIG. 1 illustrates the manner in which a call flow constructed using PC NAPTool is visualized within the NAPTool program. PC NAPTool is also used to create a language table (FIG. 4) for the network application that specifies a language identifier and SPIN ID for each language subset (e.g., MAIN, SPEECH, BRIEF, or USER) of each language supported by the network application. FIGS. 14 and 15, described hereinafter, show two of the screens (dialog boxes) that PC NAPTool presents to the developer to create a network application and to enter information needed to generate the language table. Once the necessary call flows for a network application have been completed using PC NAPTool, the PC NAPTool program 352 provides the capability to transfer the call flow data to the UNISYS A Series digital computer system via a path 355.

Further in accordance with the preferred embodiment of the present invention, an Installation Manager program 354 running on the A Series system takes the SPIN application information and the call flow data received from the PC SPIN and PC NAPTool programs 350, 352 and installs the information in appropriate files on the system. In particular, the Installation Manager 354 invokes the A Series SPIN program 12 in order to load the prompt definitions, element definitions, Indexed Prompt Table, Dynamic Element Table, and other information that comprise each SPIN application into a SPIN database (SPINDB) 15. The network application, including its call flow data, is stored at 380 for execution on the A Series system. The language table is installed in a file 374 for access by an agent 368 during execution of a network application. The table 374 is used to obtain the SPIN ID of a selected subset of prompts. The Installation Manager also provides a screen interface similar to that provided by PC NAPTool 352, which, if desired, can be used to add and delete languages and to change the SPIN IDs assigned to various language subsets during application configuration on the A Series system.

Other modifications to the system described in said U.S. Pat. No. 5,493,606, include modifications to the Prompt Expansion Processor 372, and the creation of a vocabulary file 356 by the Installation Manager to support the speech recognition capabilities of the system, described hereinafter in greater detail. Additionally, in the present embodiment, the Network Interface Unit described in said U.S. Pat. No. 5,493,606 is implemented using a Telephony Services Processor (TSP) 370 commercially available from UNISYS Corporation. The TSP 370 provides the interface for NAP 11 to the telephone network 35 and executes software for performing speech recognition functions, as described hereinafter.

Although the overall function and operation of the NAP 11 and related system components have been described in commonly assigned U.S. Pat. Nos. 5,133,004 and 5,493,606, the following explanation is provided for continuity herein. A network application 380 communicates with NAP 11 through an agent 368 and also utilizes the agent 368 to communicate with the Prompt Expansion Processor (PEP) 372. The agent 368 is part of the runtime environment of the network application 380. Among the functions performed by the agent 368 are control of call flow execution (the next function to be executed is based on the result of the previous function), passing of parameters to various functions, translating new dialog activity into call states, saving information from NAP responses for use during call flow execution, and entering call flow information into memory-based state tables. The agent 368 executes the network application call flows (generated using PC NAPTool) in an interpretive manner.

As described in U.S. Pat. No. 5,133,004, the network application 380 commands the NAP 11 via AIM commands to perform the functionality required by the network application. The agent 368 directs the AIM commands to NAP 11 via logic 17. When a network application 380 requires that a prompt be played, the agent 368 directs a PEP command to the PEP 372 via logic 18. The SPIN 12 program communicates with NAP 11 through a Communication Management System (COMS) 19. It is appreciated that SPIN 12 is an application to NAP 11 communicating through COMS 19 in the manner described in said U.S. Pat. No. 5,133,004.

The NAP 11 includes an Application Interface Module (AIM) 30 which is the central communication module of NAP. The SPIN 12 program communicates with AIM 30 through COMS 19. The network application 380 communicates directly with AIM 30 via the agent 368. The playing of prompts commanded by the network application 380, as expanded by the PEP 372, is also effected through NAP 11 via the AIM 30. As mentioned above, in the present embodiment, the NAP 11 also includes a Telephony Services Processor (TSP) 370 that provides the interface between the NAP 11 and the telephone network 35. The TSP 370 effects call switching under control of applications communicating with the NAP 11 through the AIM 30.

The NAP 11 includes a Voice Message Management Module (VMMM) 32, a Voice File 33 and a Voice Input/Output Data Base (VIODB) 34. The VMMM 32, in response to commands received through AIM 30, sends identified voice messages stored in the Voice File 33 over a telephone connection effected through the TSP 370 and receives voice messages from a telephone connection established through the TSP 370 for storage in the Voice File 33. VMMM 32 assigns NAP Message IDs to received and recorded voice messages and, via AIM 30, returns these voice Message IDs to the application involved in the telephone call. The NAP Message IDs corresponding to the messages stored in the Voice File 33 are maintained in the VIODB 34 for accessing the messages. Each voice message stored in the Voice File 33 has a unique NAP Message ID associated therewith. Details of the VMMM 32, Voice File 33 and VIODB 34 can be found in said U.S. Pat. No. 5,133,004 and further details can be found in U.S. Pat. No. 5,138,710, issued Aug. 11, 1992. Said U.S. Pat. No. 5,138,710 is also incorporated herein by reference in its entirety.

The SPIN 12, described in said U.S. Pat. No. 5,493,606, can be used with the NAP 11 and the SPIN Administration Facility 40 to record the voice for each of the static and dynamic elements. The voice for each element is stored in the Voice File 33, and the NAP 11 returns to SPIN 12 a unique NAP Message ID for each recorded voice message corresponding to an element. SPIN 12 stores the NAP Message IDs corresponding to each element in an element record within the SPIN DB 15, as described in said U.S. Pat. No. 5,493,606. These records provide a mapping between the element names used by PC SPIN 350 to identify elements, and the actual NAP Message IDs associated with the recorded voice for each element in the Voice File 33. Further details of SPIN 12 and the SPIN Administration Facility are provided in said U.S. Pat. No. 5,493,606.

As mentioned above, a collection of prompt definitions, elements, element voice in Voice File 33, Dynamic Element Table, Indexed Prompt Table, vocabulary lists and word lists, and an MDDP 14 for processing dynamic data—all for a particular language subset—is denoted as a SPIN application. The records 360 in SPINDB 15, as well as the MDDP 14, are illustrated in FIGS. 6A–B exemplifying the various SPIN applications named in the example of FIGS. 3 and 4, for selectively playing the prompts of a given subset in either American-English, French, or Spanish.

The PEP 372 expands a prompt commanded by a network application 380 into the appropriate sequence of NAP Message IDs for speaking the prompt. The PEP 372 includes Expand Prompts logic 366 that receives an ESP or EMSP command from the agent 368 on a path 61 and returns the corresponding sequence of NAP Message IDs to the agent 368 on a path 62. The PEP 372 includes Build Cache Tables logic 362 for building cache tables 364 from the SPINDB 15 for rapid retrieval of information. The Build Cache Tables logic 362 constructs a set of cache tables 364 for each of the SPIN applications using the records 360 of SPINDB 15. The Build Cache Tables function can be initiated for a SPIN application by PEP when it initializes, or by the user via path 50, or by default via path 61 if the tables have not yet been built. The Expand Prompts logic 366 accesses the cache tables 364 for constructing the sequence of NAP Message IDs on the path 62 in response to the ESP or EMSP commands on the path 61. Further details concerning the content and structure of the cache tables 364 is found in said U.S. Pat. No. 5,493,606. As described hereinafter, in accordance with a speech recognition feature of the present invention, the cache tables 364 may further include information related to speech recognition, such as word lists, that the PEP processes in conjunction with a speech recognition request.

The PEP 372 also includes an internal Dynamic Data Processor comprising blocks 65 and 66. Block 65 is utilized by the Expand Prompts logic 366 for expanding dynamic data of dynamic element type 0 (DYN0). Similarly, block 66 is utilized by the Expand Prompts logic 366 for expanding dynamic data of type DYN2. The DYN0 procedure 65 identifies a dynamic element directly by its NAP Message ID. The DYN2 procedure 66 identifies a dynamic element by its associated text locator. It is appreciated that a further internal dynamic processor (not shown) can be incorporated in the PEP 372 for processing dynamic element type 8 (DYN8) for Element Name. The DYN8 procedure would locate the named element in the appropriate cache table and provide the NAP Message ID corresponding thereto.

As described in detail in said U.S. Pat. No. 5,493,606, the MDDP 14 includes procedures denoted by reference numerals 70–75 for expanding dynamic data received in a play prompt command with respect to various dynamic element types and subtypes. Procedure 70 expands DYN 1 type dynamic data for date/time. Procedure 71 expands DYN3 type dynamic data for cardinal numbers. Procedure 72 expands DYN4 type dynamic data for Digit Strings. Procedure 73 expands DYN5 type dynamic data for telephone numbers. Procedures 74 expand dynamic data of user-defined dynamic types. MDDP 14 also includes additional procedures (not shown) for dynamic element types DYN6 and DYN7 for expanding dynamic data in a Money or in an Alphanumeric format, respectively. Routines within these procedures can expand dynamic data with respect to dynamic element subtypes as schematically represented by reference numeral 75. The MDDP DYN procedures expand dynamic data into a series of element references that are returned to the Expand Prompts logic 366 of the PEP 372. The Expand Prompts logic 366 uses each element reference to retrieve the associated NAP Message ID from the cached Dynamic Element Table in the cache tables 364 for the associated SPIN application. Each SPIN application can have its own MDDP 14 (as illustrated in FIG. 6A–B), or two or more SPIN applications can use the same MDDP. The procedures of an MDDP are constructed in accordance with the format of the dynamic data types and subtypes of the language subset for which a given SPIN application is constructed. Further details of this process are provided in said U.S. Pat. No. 5,493,606.

With continued reference to FIGS. 6A–B, a network application 380 uses PEP commands to request the playing of prompts and to supply any dynamic data required by a prompt. A PEP command from a network application 380 is intercepted by the agent 368 and passed to PEP 372 along a path 61 for expansion. The PEP 372 returns an ordered list of NAP Message IDs on a path 62 required to play voice for the requested prompt. The agent 368 then constructs and submits a NAP Extended Send Voice Message command with the ordered list of Message IDs to the NAP 11. The NAP 11 retrieves the digitized voice corresponding to each Message ID from the Voice File 33 and plays it over the telephone connection established for the requesting network application.

PEP commands include the Enhanced Send Prompt command (ESP) and the Enhanced Multi-Send Prompt command (EMSP). ESP is of NAP Message Type 302 and EMSP is of NAP Message Type 303. The ESP command is utilized by network applications to request NAP 11 to play one prompt over the established telephone connection. The prompt ID of the prompt to be played, the SPIN ID associated with the language subset containing the prompt definition for that prompt, and any dynamic data required by the prompt, are contained in the body of the command. Dynamic data for dynamic element types Message ID, date/time, text locator, cardinal number, digit string and phone number can be supplied in limited number (2 or 3). Further details of the format of the ESP command are provided in said U.S. Pat. No. 5,493,606.

The EMSP command is utilized by network applications to play one or more prompts over the established telephone connection. For a basic request to play multiple prompts defined in the base subset of the currently active language, the command contains the prompt IDs for the prompts to be played followed by any dynamic data required by the prompts, and also contains the SPIN ID associated with the base subset containing the prompt definitions for those prompts. Dynamic data for dynamic element types Message ID, date/time, text locator, cardinal number, digit string, money, alphanumeric, element name and any user-defined types can be supplied in any number (not to exceed the maximum command length). The ESP command and the EMSP command are comprised of a command header and a command body. The header is the same as that disclosed in said U.S. Pat. No. 5,133,004 as the AIM command header.

Figure 7:
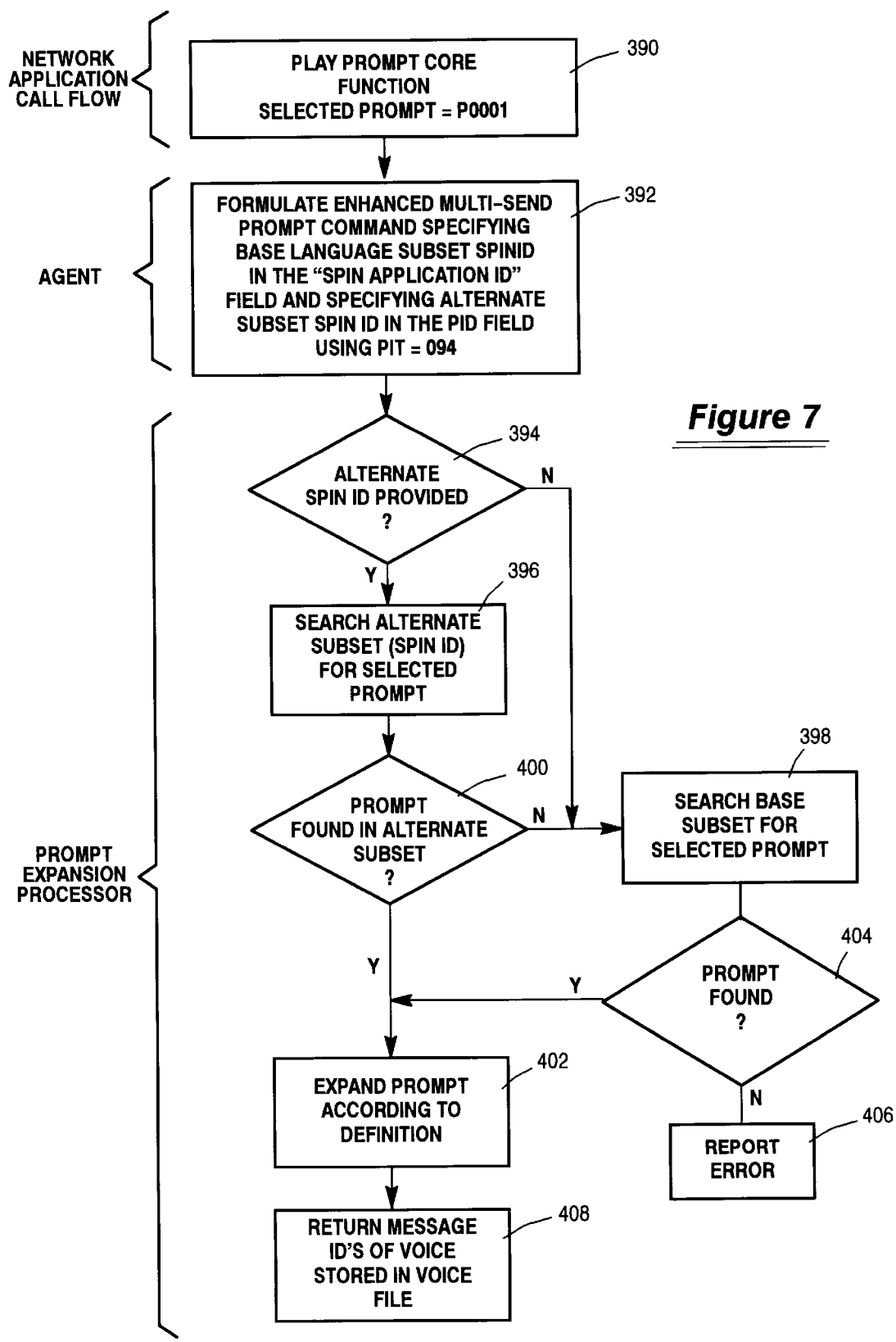
FIG. 7 is a flow diagram illustrating a preferred embodiment of a method of the present invention.
Figure 7A:
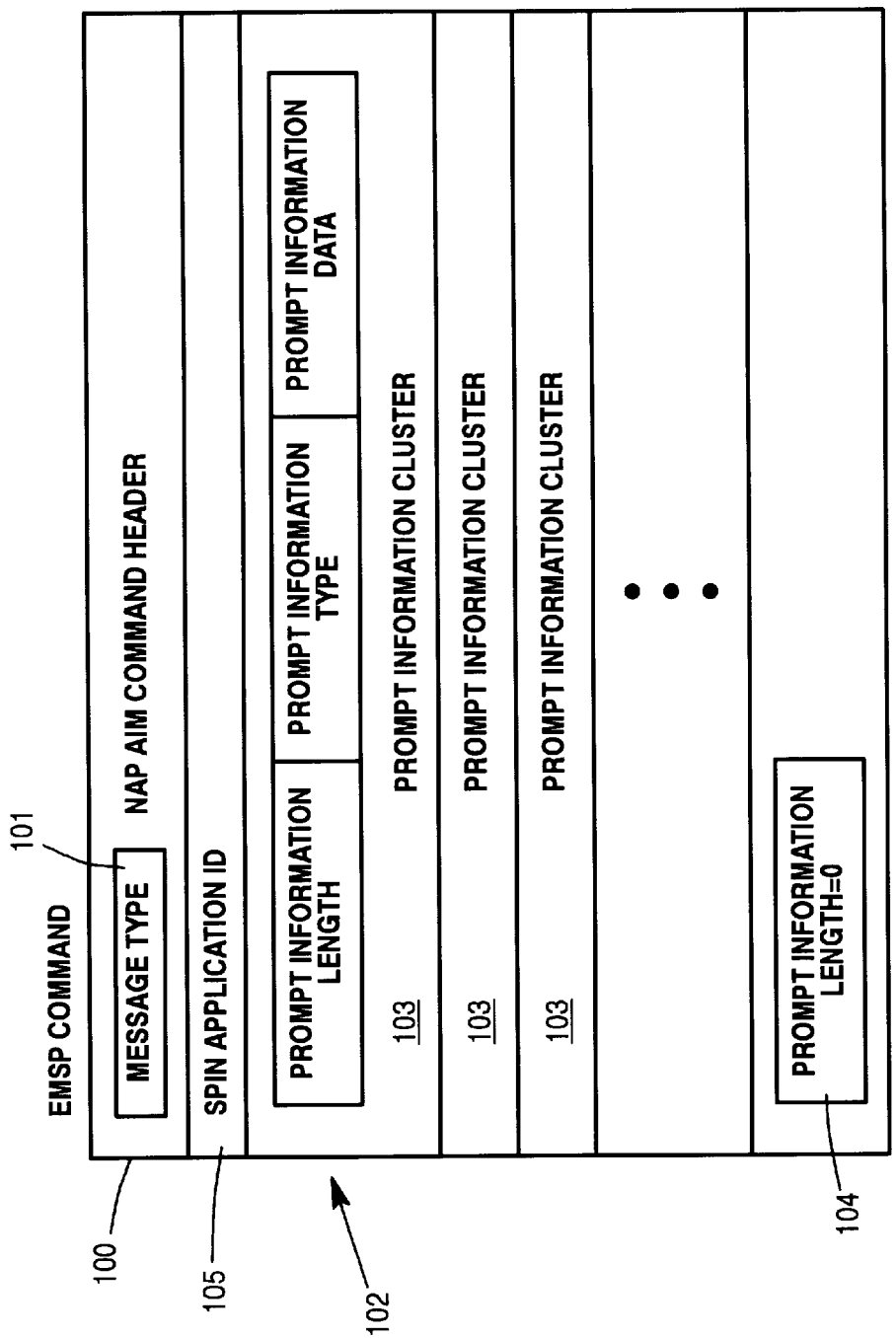
FIG. 7A is a chart illustrating the components and fields of an Enhanced Multi-Send Prompt (EMSP) command.

Referring to FIG. 7A, with continued reference to FIGS. 6A–B, the format of the EMSP command is illustrated. The EMSP command includes a NAP AIM command header 100. The header 100 includes a Message Type field 101 for designating the command Message Type. The remainder of the command comprises the command body 102. The command body includes a "Spin Application ID" field 105 for specifying the name of the SPIN application that owns the prompts of the base subset (e.g., MAIN) for the currently selected language. The command body further includes one or more Prompt Information Clusters 103 that are repeated in sets for each prompt to be played, up to a maximum command length of 500 bytes.

The Prompt Information Cluster 103 consists of three consecutive fields denoted as Prompt Information Length (PIL), Prompt Information Type (PIT), and Prompt Information Data (PID). The Prompt Information Cluster 103 contains either a prompt request, dynamic data, or other information as designated by the PIT field. A prompt that requires dynamic data is specified utilizing multiple Prompt Information Clusters. The first cluster is the prompt request cluster followed by each dynamic data cluster required for the prompt, in the order in which the dynamic data is to be played. The PIL field specifies the length of the Prompt Information Cluster, including the PIL, PIT, and PID fields. As indicated by reference numeral 104, the end of the command is marked by specifying a PIL of zero.

The PIT field specifies the type of data contained in the current PID field of the Prompt Information Cluster. The data can be a prompt request or a dynamic data request. PIT values include:

000=message ID
001=Date and Time
002=Text Locator
003=Cardinal Number
004=Digit String
005=Phone Number
006=Money
007=Alphanumeric
008=Element Name
009–0097=Reserved
098=Prompt Index Value
099=Prompt Name
100–999=User-Defined Dynamic Element Types.

It is appreciated that for PIT values 000 through 008, the numerical value is the same as the corresponding dynamic element type. If the PIT field contains 000 through 008 or 100 through 999, the PID field contains the dynamic data to be played for the dynamic element type. If the PIT field contains 098 or 099, the PID field contains the index number or name, respectively, of the next prompt to be played. In addition to these prompt information types, new prompt information types have been defined in accordance with the present invention. In particular, as described hereinafter, a new Prompt Information Cluster type (PIT=094) has been defined to specify the SPIN ID of an alternate subset of prompt definitions, and another new Prompt Information Cluster type (PIT=095) has been defined to provide the name of a word list to be used during a speech recognition request. Further details of the use of Prompt Information Clusters to provide prompt and dynamic data information are found in said U.S. Pat. No. 5,493,606.

According to an important feature of the present invention, two commands are added to those that can be executed by a network application call flow—Set Language and Set Language Attributes. The Set Language command is used to specify the language, e.g., American-English, French, Spanish, etc. that the network application is to use when playing prompts. The command contains a single input field which specifies the language identifier (e.g., AE, FR, or SP) of the selected language. The default language identifier is AE. The default can be set or changed in PC NAPTool using an Application Defaults dialog box (not shown).

When the Set Language command is executed by a network application call flow, the agent 368 accesses the language table 374 to obtain the SPIN ID of the base subset (MAIN) of prompt definitions for the selected language, and stores that SPIN ID in an internal dialog area (not shown). Thereafter, when a network application executes a play prompt command specifying the prompt ID of a prompt to be played, the prompt definition for that prompt is obtained from the base subset of prompt definitions for the selected language, i.e., the base subset having the SPIN ID that is stored in the internal dialog area of the agent 368. In particular, in response to a play prompt command, the agent 368 assembles either an ESP or an EMSP PEP command, and inserts the SPIN ID of the base subset of prompts for the selected language (i.e., the SPIN ID stored in its internal dialog area) in the appropriate SPIN ID field of the command (e.g., field 105 of the EMSP command illustrated in FIG. 7A). The ID of the prompt to be played is also inserted into the appropriate field of the PEP command. The command is then issued to the PEP 372, which obtains the appropriate prompt definition from the cache table 364 for the specified SPIN application and expands the prompt in the manner described above.

The Set Language Attributes command allows a network application to specify an alternate subset of prompt definitions (e.g. SPEECH, BRIEF or USER) to be accessed during execution of a play prompt function. The following table illustrates the fields of the Set Language Attributes command:

| Language Subset | Set/Reset Subset | Speech Recognition Enabled |
| --- | --- | --- |

When an alternate subset is to be designated, the Set/Reset Subset field is set to a value of "Set Language Subset", and the Language Subset field is used to specify which of the four types of subsets (i.e., MAIN, SPEECH, BRIEF, or USER) for the current language is to be designated as the alternate subset. A value of "Reset Language Subset" in the Set/Reset Subset field will remove or undesignate the currently selected alternate subset. If the Set/Reset Subset field has a value of "Ignore," the command will have no effect on the current alternate subset. This value is used when the Set Language Attributes command is being used solely to turn speech recognition on or off. The Speech Recognition Enabled field is used to turn the speech recognition capabilities of the present invention (described hereinafter) on and off. This field can have a value of "Ignore" in which case the current speech recognition setting (e.g., on or off) is not changed, a value of "Set Speech" in which case speech recognition is turned on, or a value of "Reset Speech" in which case speech recognition is turned off When the Set Language Attributes command is executed to establish an alternate subset, the agent 368 accesses the language table 374 to determine the SPIN ID associated with the subset (e.g., MAIN, SPEECH, BRIEF, or USER) identified in the Language Subset field of the command. The SPIN ID associated with the selected alternate subset is then stored by the agent 368 in its internal dialog area along with the SPIN ID of the base subset. Thereafter, whenever a play prompt function is executed, the PEP 372 will first search the alternate subset for a prompt definition for the requested prompt, and if a prompt definition for that prompt is located in the alternate subset, the PEP will expand the prompt in accordance with that definition. However, if no prompt definition for the requested prompt is located in the alternate subset, then the PEP 372 will search the base subset for the appropriate prompt definition.

In order to provide the SPIN ID of the alternate subset to the PEP 372 during execution of a play prompt function, a new type of Prompt Information Cluster is defined for the Enhanced Multi-Send Prompt command. The new type of Prompt Information Cluster has a Prompt Information Type (PIT)=094. The Prompt Information Data associated with this PIT is the SPIN ID of the alternate subset. When the agent 368 assembles the EMSP command in response to a play prompt function in the network application call flow, the agent inserts the SPIN ID of the base subset in the normal SPIN Application ID field 105 (see FIG. 7A) of the EMSP command, creates a Prompt Information Cluster having a PIT of "094," and places the SPIN ID of the alternate subset in the PID field of that cluster. Other Prompt Information Clusters are generated to supply the remaining information needed to process the request.

FIG. 7 is a flow chart further illustrating these aspects of the present invention.

Assume that a network application call flow has already executed a Set Language command specifying a particular language and causing the agent 368 to store the SPIN ID of the base subset of the selected language in its internal dialog area (or the SPIN ID of the base subset for the default language was stored). Assume further that the network application call flow has executed a Set Language Attributes command specifying the SPIN ID of an alternate subset (e.g., SPEECH, BRIEF, or USER) of prompt definitions, causing the agent 368 to also store the SPIN ID of the alternate subset in its internal dialog area.

Referring to FIG. 7, at step 390, the network application call flow executes a play prompt function requesting that a prompt having a prompt ID=P0001 be played. At step 392, control passes to the agent 368 which constructs the enhanced multi-send prompt (EMSP) command, specifying the SPIN ID of the base subset in field 105 (see FIG. 7A), specifying the SPIN ID of the alternate subset in the PID field of a Prompt Information Cluster 103 having a PIT=094, and specifying the prompt ID (P0001) and any required dynamic data in other Prompt Information Clusters of the command. The agent 362 then passes the command to the Expand Prompts logic 366 of the PEP 372. At step 394, the Expand Prompts logic 366 determines whether a SPIN ID for an alternate subset of prompt definitions has been provided. If so, control passes to step 396 where the Expand Prompts logic 366 consults the cache table 364 containing the information (including the prompt definitions) for the SPIN application having the SPIN ID associated with the alternate subset. At step 400, the Expand Prompts logic 366 uses the prompt ID of the selected prompt to determine whether a prompt definition exists for that prompt in the cache table. If so, control passes to step 402.

If either no alternate subset had been specified (step 394) or the Expand Prompts logic 366 of the PEP 372 did not find a prompt definition for the requested prompt in the cache table containing the specified alternate subset of prompt definitions (step 400), control passes to step 398 where the Expand Prompts logic 366 consults the cache table 364 containing the prompt definitions of the base subset. At step 404, the Expand Prompts logic 366 determines from the cache table whether a prompt definition for the selected prompt is provided in the base subset. If not, the PEP 372 reports an error to the agent (step 406). If a prompt definition is found, control passes to step 402.

At step 402, the PEP expands the prompt in accordance with the appropriate prompt definition. More specifically, the Expand Prompt 366 logic uses the prompt definition for the requested prompt to first retrieve the NAP Message IDs corresponding to the static elements of the prompt. The Expand Prompts logic 366 places these NAP Message IDs in an output buffer (not shown) in appropriate locations in accordance with the prompt definition. For each dynamic element in the prompt definition, the Expand Prompts logic 366 sends the dynamic element type and subtype and the corresponding dynamic data from the EMSP command to the appropriate procedure in the MDDP 14 associated with the active SPIN ID. The MDDP 14 returns a sequence of element references corresponding to the dynamic data in the EMSP command for the dynamic element type/subtype in the order prescribed by the associated dynamic element type procedure. The Expand Prompts logic 366 then accesses the associated Dynamic Element Table in the appropriate cache table 364 and retrieves the sequence of NAP Message IDs corresponding to the returned sequence of element references. the Expand Prompts logic 366 then inserts these NAP Message IDs for each dynamic element in the prompt definition in the appropriate locations in the output buffer.

The agent 368 then constructs and submits a NAP Extended Send Voice Message command with the ordered list of Message IDs to the NAP 11. The NAP 11 retrieves the digitized voice corresponding to each Message ID from the Voice File 33 and plays it over the telephone connection established for the requesting network application. Upon successful transmission of the prompt, the NAP 11 returns a Message Sent response to the agent 368. The agent 368, in turn, sends a Prompt Sent result to the requesting network application call flow to complete the process.

The exemplary call flow of FIG. 1 illustrates the use of the Set Language and Set Language attributes commands in a call flow. In the example shown, a call is initiated at call state 302. Upon successful initiation of the call a value of "001" will be returned, and control will pass to call state 306. At this point, the American_English language (language ID=AE) is automatically selected as the default language, and the agent 368 automatically stores the SPIN ID associated with the base subset for that language in its internal dialog area. Call state 306 executes a play prompt function to play prompt P1101. The prompt P1101 will be played according to its prompt definition in the base subset for the American-English language. In this example, the prompt definition for P1101 in the American-English base subset plays the voice "If you have a touch tone phone, press 1." If a specified amount of time passes without indication that the caller pressed any key on the caller's keypad (i.e., a time-out condition (T) occurs), control passes to call state 310. If any key is pressed (even though the prompt asked for the "138 key to be pressed), it is assumed that the user has a touch tone phone and control passes to call state 308.

Assume first that the user has a touch tone phone, and that control therefore passed directly from call state 306 to call state 308. Call state 308 executes another play prompt function requesting that prompt P1110 be played. Again the prompt will be expanded and played according to the prompt definition for P1110 in the American-English base subset. In this example, the prompt definition for P1110 in the American-English base subset plays the voice "Press 1 to hear prompts in Spanish, press 2 to hear prompts in English, press 3 to hear prompts in French." If the caller presses the "*" key, control will pass to call state 314 which will initiate procedures to disconnect the call. If the caller presses any key other than a "1," "2," or "3," control will loop back to call state 308 (as indicated by the call state pointer 322), causing the same prompt to be played.

Assume that the caller is French and presses the "3" key in response to prompt P1110. Control will pass from call state 308 to call state 320. At call state 320, the call flow executes a Set Language command specifying the language identifier (language ID=FR) for the French language. This causes the agent 368 to access the language table 374 to determine the SPIN ID assigned to the base subset (MAIN) for the French language (FR). This new SPIN ID is then stored in the agent's internal dialog area in place of the previous SPIND ID for the base subset of the American$_{13}$ English language. Note also that, if an alternate subset for the previous language had been set, the SPIN ID of that alternate subset would also have been changed to the SPIN ID of the corresponding subset of the new language. That is, when a Set Language command is executed to change the current language to a different one, both the base and alternate SPIN IDs are updated for the new language. Specifically, the SPIN ID of the base subset of the current language and the SPIN ID of any alternate subset are replaced in the internal dialog area of the agent by the SPIN IDs of the corresponding base subset and alternate subset for the new language.

At the next call state (324), which executes a play prompt function to play the prompt having a prompt ID=P1100, the prompt definition for that prompt will be retrieve from the French language base subset, and will therefore be heard by the caller in French. A similar result would have occurred if the user had selected the Spanish language, i.e., the Spanish language base subset would be used.

To illustrate the Set Language Attributes feature, assume that after hearing prompt P1101 in call state 306, the user does not have a touch tone phone and the function times out. Control will then pass to call state 310. In this example, call state 310 executes a Set Language Attributes command requesting that the SPEECH subset of the currently selected language (in this case American_English) be designated as an alternate subset. In response, the agent 368 accesses the language table 374 to determine the SPIN ID associated with the SPEECH subset of the current language and stores that SPIN ID in its internal dialog area. Control then loops back to call state 308, as indicated by the call state pointer 312. When the play prompt function is executed at call state 308, the agent 368 assembles the EMSP command providing both the SPIN ID of the base subset (MAIN) and the SPIN ID of the alternate subset to the PEP 372 in the manner described above. In this example, there is a prompt definition for prompt P1110 in the alternate subset (SPEECH) which causes the following voice to be played to the caller "Speak 1 to hear prompts in Spanish, speak 2 to hear prompts in English, speak 3 to hear prompts in French." This prompt definition differs from the one in the base subset. It is a modified form of the prompt definition in the base subset that is tailored for speech recognition. Had no prompt definition for prompt P1110 existed in the alternate subset (SPEECH), the previously described prompt definition in the base subset would have been played. Through use of the Set Language Attributes command, the network application developer is able to cause this alternate prompt to be played at call state 308 without having to modify the call state or any other aspect of the call flow. The selection of prompts from different subsets is transparent to the call flow.

As can be appreciated, in order to take full advantage of the power of the Set Language and Set Language Attributes features of the present invention, corresponding prompt definitions in the different subsets should be assigned the same prompt IDs across all subsets. Similarly, this correspondence of prompt IDs should be carried across languages, as well. The ability to create alternate subsets, in combination with the protocol for searching the alternate and then the base subsets for a prompt definition, creates a very powerful feature. Alternate subsets, such as the SPEECH and BRIEF subsets exemplified above, can be created that contain modified prompt definitions that apply during only a part of a call flow, or at only certain call states of a call flow. The ability to create subsets of prompt definitions that apply during only a part of a call flow significantly reduces the space required for storage of prompt definitions, and allows modified forms of certain prompts to be played at certain call states without requiring any change to the network application call flow.

Speech Recognition

According to another aspect of the present invention, speech recognition capabilities are provided. In the preferred embodiment, speech recognition capability is implemented on the TSP 370 using the VPro Portable Recognizer Library™ software available from Voice Control Systems, Inc., 14140 Midway Road, Dallas, Tex. 75244. The VPro Portable Recognizer Library™ consists of a library of object modules that perform speech recognition functions and that can be linked with a user application or task. The TSP 370 consists of a host interface processor (HIP), a packet data processor (PDP), a primary rate interface module (PRIM), and a packet digital signal processor (PDSP), all of which are boards (not shown) that communicate over a common backplane. The HIP controls communication with the A Series host computer by routing requests (including speech recognition requests) among the appropriate boards of the TSP 370. The PDP is the central processing module of the TSP 370. The PRIM is responsible for the actual physical connection to the network 35. More than one PRIM may be present in the TSP 370. Each PRIM has one E1 or T1 connection and supports software that transmits bearer data to and from the PDP. The PDSP comprises an i960 processor available from Intel corporation and a plurality of digital signal processors, such as, for example, in the preferred embodiment, a plurality of TI320C40 digital signal processors commercially available from Texas Instruments, Inc. When a speech recognition request is received by the TSP 370, the i960 processor loads the appropriate code from the VPro Portable Recognizer Library™ into the memory space of one of the digital signal processors, which then executes the code to perform the speech recognition function.

In the present embodiment, the VPro Portable Recognizer Library™ software requires a vocabulary module, which contains at least one vocabulary against which received voice is compared. A vocabulary module can contain multiple vocabularies. A vocabulary is a subset of the words in a vocabulary module.

During development of a network application that will provide speech recognition functions, the developer must create a list of all words that must be recognized at the various points in the application's call flow. This comprehensive list forms the basis of a vocabulary module. This list must then be partitioned into various subsets representing words that would be recognized at different points in the call flow. This forms the foundation for the words which make up the individual vocabularies. For example, the developer of a voice messaging application might determine that the application will need to recognize the words "one," "two," "three," "four," "five," "six," "seven," "eight," "nine," and "zero" in order to recognize a user's password at one point in a call flow, and might need to recognize the words "yes," "no," "review," "delete," and "save" at other points in the call flow, for example, in order to recognize a user's desire to review, delete or save messages when so prompted.

Once the words of the vocabulary module and each vocabulary are identified, they are provided to a vendor who then creates the actual vocabulary module file (or files) required, provides documentation specifying the contents of the vocabularies and their associated identifiers (VINXs), and provides documentation specifying a word index for each word in the vocabulary module. In the present embodiment, the vendor of the VPro Portable Recognizer Library™ software, Voice Control Systems, Inc., provides the vocabulary modules requested by the developer.

The following illustrates the contents of an exemplary vocabulary module that might be supplied in response to a request from a developer:

| Vocabulary Module (e.g., AMERICAN_ENGLISH) | |
| --- | --- |
| Word Index | Word |
| 0 | zero |
| 1 | one |
| 2 | two |
| 3 | three |
| 4 | four |
| 5 | five |
| 6 | six |
| 7 | seven |
| 8 | eight |
| 9 | nine |
| 10 | review |
| 11 | delete |
| 12 | save |
| 13 | yes |
| 14 | no |

The name of the vocabulary module is "American$_{13}$ English." The column headed "word" lists the various words of the vocabulary module that the speech recognition software is capable of recognizing. The column headed "word index" provides a global index for each recognizable word within the vocabulary module.

The following table lists the information that might be provided concerning the vocabularies specified within the exemplary vocabulary module above:

| Vocabulary ID (VINX): 0000 | | Vocabulary ID (VINX): 0001 | |
| --- | --- | --- | --- |
| Word Index | Word | Word Index | Word |
| 0 | zero | 10 | review |
| 1 | one | 11 | delete |

-continued

| Vocabulary ID (VINX): 0000 | | Vocabulary ID (VINX): 0001 | |
|---|---|---|---|
| Word Index | Word | Word Index | Word |
| 2 | two | 12 | save |
| 3 | three | 13 | yes |
| 4 | four | 14 | no |
| 5 | five | | |
| 6 | six | | |
| 7 | seven | | |
| 8 | eight | | |
| 9 | nine | | |

In this example, two vocabularies have been identified. Each vocabulary has been assigned a unique vocabulary identifier (VINX) that provides an index into the vocabulary module for the words of the vocabulary.

According to a preferred embodiment of the speech recognition aspects of the present invention, for each SPIN application that will support speech recognition, the network application developer uses the PC SPIN program to create a vocabulary list and one or more word lists that contain the information required to perform speech recognition using the vocabulary module(s) and vocabularies supplied by Voice Control Systems, Inc. FIG. 8 shows the contents of an exemplary vocabulary list 410 that the PC SPIN user creates to provide information relating to the vocabulary module in the example above. One entry 412 in the list 410 provides a name that the network application developer assigns to the vocabulary module. This is the name by which the vocabulary module is known to the network application. This entry is followed by a plurality of successive entries 414 that provide the global Word Index (assigned by the vocabulary module vendor) for each word in the vocabulary module.

FIG. 9 shows the contents of an exemplary word list 416 that the PC SPIN user creates to provide information relating to a vocabulary within the vocabulary module of FIG. 8. In the example shown, the word list 416 contains the information that would be generated for the vocabulary having a VINX=0001 in the example above. One entry 418 in the word list specifies a name assigned to the word list by the network application developer. This is the name by which the word list is known to the network application. In the present embodiment, the name assigned to a wordlist must have the following format: <VINX>_<User-Defined Name (up to 8 chars.)>. The first part of the word list name provides the vendor supplied VINX for the vocabulary for which the word list is being created. The second part of the name (following the underscore) preferably is descriptive of the word list. For example, a word list name of "0001_APPSPCH" identifies a word list created for a vocabulary having a VINX=0001 and the characters "APPSPCH" might be used to convey that the list is associated with a SPIN application containing prompt definitions of the SPEECH subset of a given language.

Another entry 420 in the word list specifies the name of the vocabulary module of which the vocabulary is a part. In this example, the vocabulary module name is American_English." The word list name and vocabulary module name entries 418, 420 are followed by a series of entries 422, one for each word of the vocabulary. Each word entry provides a mapping between a word to be recognized and a DTMF digit to be returned when the word is recognized. In particular, each word entry contains the Word Index of the word from the vocabulary module, followed by the DTMF digit to be returned if that word is recognized. In the example shown, an entry for the word "review" contains its Word Index, "10," followed by a DTMF digit of "1". If the system recognizes that a caller has spoken the word "review," the system will return a DTMF digit of "1."

The vocabulary list and word list(s) for a given SPIN application are transferred to the A Series computer system at the same time as the other SPIN application information is transferred. The word list(s) for a given SPIN application are stored in the SPIN DB along with the prompts, elements, Dynamic Element Table, Indexed Prompt Table, and other information for that SPIN application. In the present embodiment, the vocabulary list(s) created by PC SPIN 350 are not stored in the SPIN DB 15. The Build Cache Tables logic 362 includes the word list information for each SPIN application in the cache tables 364, for use by the PEP 372 whenever a speech recognition request is made in connection with a play prompt function, as described hereinafter.

At system initialization, all vendor supplied vocabulary modules that will be used by a network application are loaded onto the NAP 11 system. During a speech recognition attempt, the PDSP board (not shown) of the TSP 370 that executes the VPro Portable Recognizer Library™ code accesses the appropriate vocabulary module from a local memory on the PDSP board. Vendor supplied vocabulary modules can be loaded directly into the local memory of the PDSP board and/or can be stored in the Voice File 33 and then retrieved from the Voice File 33 when necessary.

When a vocabulary module is loaded onto the NAP 11 system, a vocabulary module identifier (VMID) is provided. The TSP 370 uses the VMID as an identifier for that vocabulary module. In the present embodiment, the VMID may have a value of from zero to four. In accordance with the present embodiment, the Installation Manager 354 is used to create a vocabulary file 356 that associates the VMID of each vocabulary module with the name assigned to the vocabulary module by the network application developer when the developer created the vocabulary list for that vocabulary module using PC SPIN (as described above). Specifically, using an input screen of the Installation Manager program 354, the user enters each vocabulary module name along with its corresponding VMID, and the Installation Manager 354 then creates the vocabulary file 356 from that information. The Build Cache Tables 362 logic stores the vocabulary file information 356 in the cache tables 364 along with the other SPIN application information.

Figure 10:
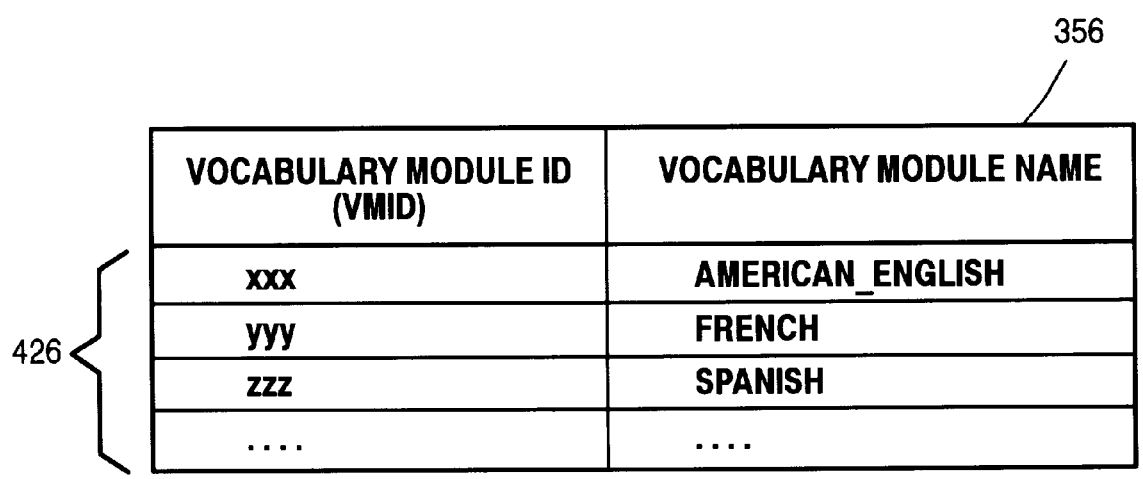
FIG. 10 illustrates the contents of an exemplary vocabulary file in accordance with he present invention.

FIG. 10 shows the contents of an exemplary vocabulary file 356 having a plurality of entries 426. Each entry has a first field that contains the VMID of a loaded vocabulary module, and a second field containing the name that the network application developer assigned to the vocabulary module using PC SPIN 350. In the example shown, the network application developer assigned the name "American_English" to one vocabulary module, and it has been assigned a VMID of "xxx." Another vocabulary module named "French" has been assigned a VMID of "yyy," and a third vocabulary module has been assigned a VMID of "zzz." The VMID and VINX of a particular vocabulary must be supplied to the NAP 11 when requesting a speech recognition attempt, as described hereinafter.

A network application call flow enables speech recognition through use of the Set Language Attributes command described above. For example, in the exemplary call flow of FIG. 1, the Set Language Attributes command executed at call state 310 could both designate the SPEECH subset of the current language as the alternate subset and at the same time enable speech recognition capabilities.

Figure 11:
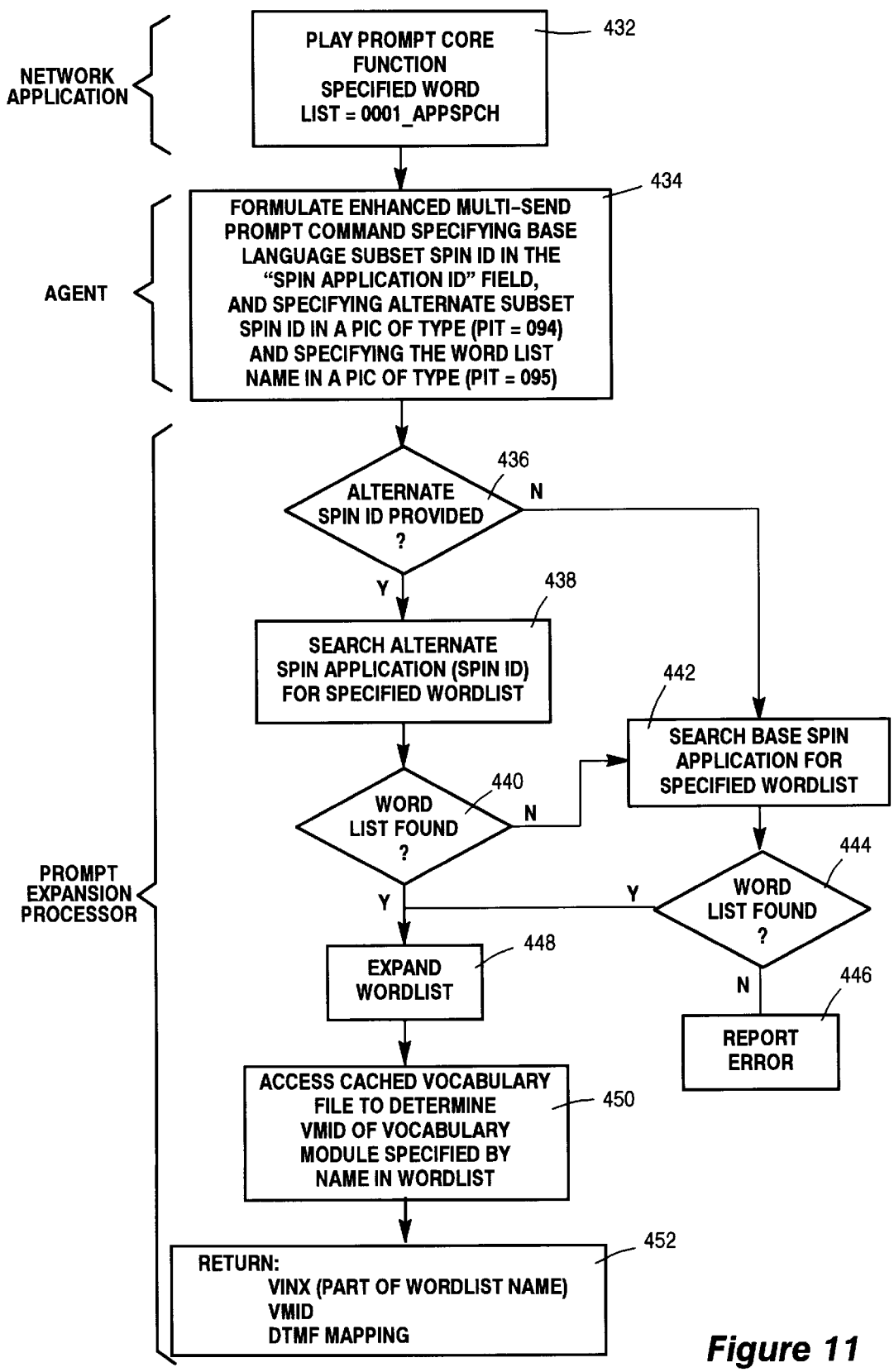
FIG. 11 is a flow diagram illustrating a preferred embodiment of the speech recognition aspects of the methods of the present invention.

FIG. 11 is a flow diagram illustrating a method for performing a speech recognition attempt in accordance with the present invention, utilizing the information contained in the vocabulary file and word lists created by the PC SPIN program. At step 432, a call flow of a network application executes a play prompt function in which the caller is expected to speak a response. The play prompt function can be used solely to play a prompt, or can also be used with a collect digits option in cases where a response (e.g., speech recognition, key pad entry) is expected from the caller. A separate collect digits function is also available for cases in which no prompt needs to be played prior to digit collection.

In the example of FIG. 11, the play prompt function is used with the digit collection option, since the caller is expected to speak a response. In this case, one of the play prompt input fields specifies the word list name of the vocabulary that contains the possible responses that the caller is expected to speak. This information is passed to the agent 368 along with the ID of the prompt to be played. The playing of the prompt is performed as described above. FIG. 11 illustrates the additional steps that are performed in connection with the speech recognition aspects of the request.

At step 434, the agent 368 assembles an EMSP command. The ID of the prompt to be played, the SPIN ID associated with the base subset of prompt definitions, and the SPIN ID associated with the designated alternate subset are placed into appropriate fields of the EMSP command in the manner described above. In accordance with the speech recognition aspects of the present invention, another new type of Prompt Information Cluster is defined for the EMSP command. The new type of Prompt Information Cluster has a Prompt Information Type (PIT)=095. The Prompt Information Data field that follows a PIT=095 is the name of the word list identified in the play prompt request, which word list contains the information relating to the vocabulary to be used for this speech recognition attempt. Once the EMSP command is assembled, the agent 368 issues the command to the PEP 372.

Next, at step 436, the Expand Prompts logic 366 determines whether an alternate SPIN ID has been provided in the EMSP command (PIT=094). If so, at step 438, the Expand Prompts logic 366 accesses the cache table 364 for the specified SPIN ID to determine if the specified word list provided in the EMSP command (PIT=095) is available. If the specified word list is found (step 440), control passes to step 448 where the word list is "expanded" in the manner described below.

If either no alternate SPIN ID is specified, or the specified word list is not found in the cache table 364 for the SPIN application associated with that SPIN ID, control passes to step 442 where the Expand Prompts logic 366 accesses the cache table 364 for the SPIN application associated with the base SPIN ID, and determines at step 444 whether the specified word list exists in that cache table. If not, the PEP 372 returns an error to the agent 368 at step 446. If the word list is found, however, control passes to step 448.

At step 448, in addition to expanding the requested prompt definition in the manner described above, the Expand Prompts logic 366 also uses the word list name passed to it in the EMSP command to "expand" the word list information in the cache table of the specified SPIN application (base or alternate). Specifically, the Expand Prompts logic 366 accesses the cache table 364 to obtain the information in the entries 422 of the cached word list (see FIG. 9). As described above, this information contains a Word Index/DTMF mapping for each word in the vocabulary. The Expand Prompts logic 366 also obtains from the word list the VINX of the vocabulary (i.e., the first part of the word list name) and the name assigned to the vocabulary module that contains the vocabulary (i.e., field 420 of the exemplary word list of FIG. 9). Next, at step 450, the Expand Prompts logic 366 uses the vocabulary module name retrieved from the word list as an index into the vocabulary file 356, which has also been cached in the cache tables 364, in order to obtain the VMID of the vocabulary module.

At step 452, in addition to returning to the agent 368 the sequence of NAP Message IDs obtained by expanding the prompt definition of the prompt to be played prior to the recognition attempt, the PEP 372 also returns the retrieved Word Index/DTMF mappings for the words of the active vocabulary, the VMID of the vocabulary module containing the vocabulary, and the index (VINX) of the vocabulary into the vocabulary module.

Figure 12:
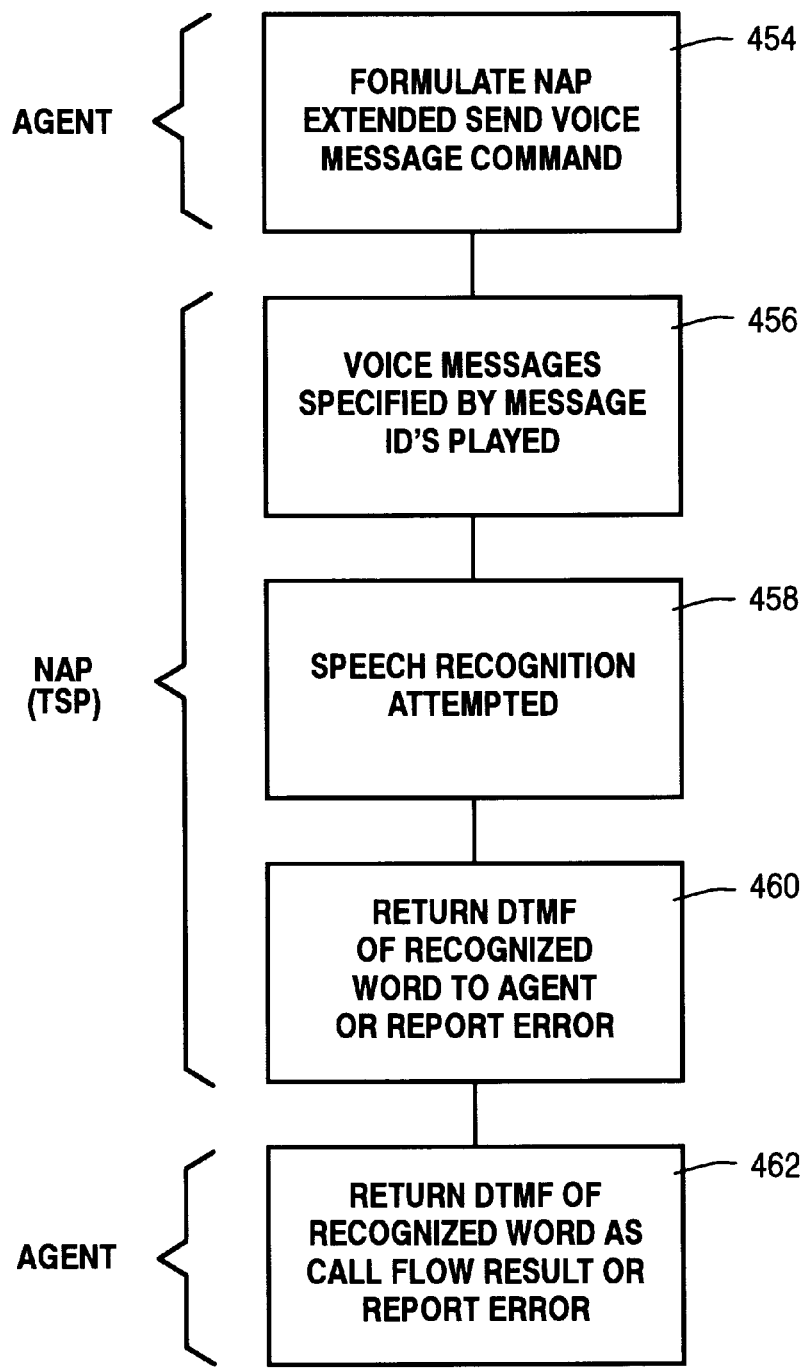
FIG. 12 is a flow diagram illustrating further details of the methods of the present invention.
Figure 13:
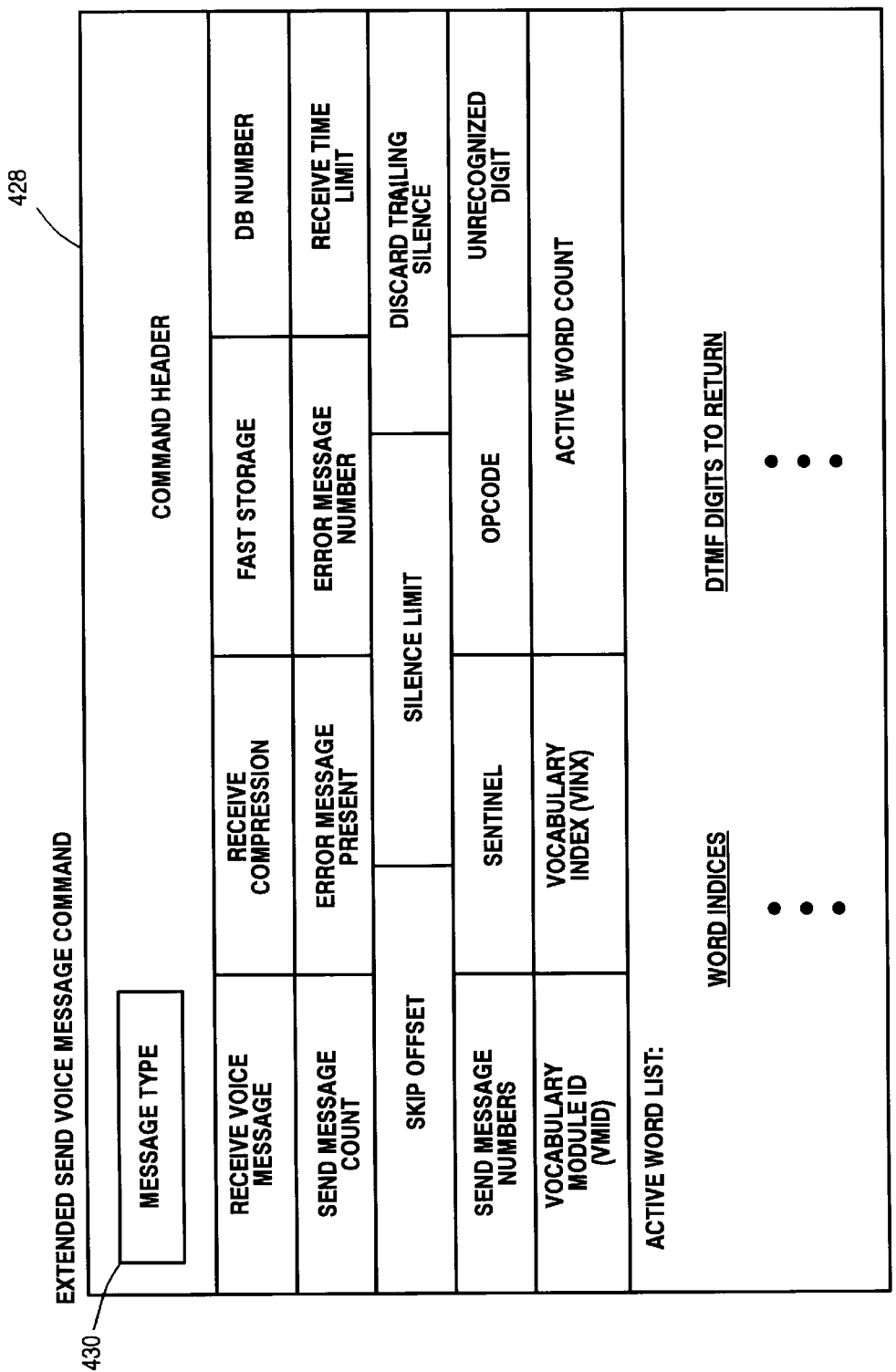
FIG. 13 is a chart illustrating the components and fields of an Extended Send Voice Message (ESVM) command modified to support speech recognition.

FIG. 12 is a flow chart illustrating further details of the method of the present invention. At step 454, the agent 368 generates a NAP Extended Send Voice Message (ESVM) command to be issued to the NAP 11. In accordance with the present embodiment, a modified Extended Send Voice Message command is provided to handle the information necessary for speech recognition. FIG. 13 shows the format of the ESVM command, as modified for speech recognition. The ESVM command includes a NAP AIM command header 428. The header 428 includes a Message Type field 430 for designating the command Message Type. The ESVM has a Message Type=46. The remainder of the command comprises the command body. A Receive Voice Message field specifies whether the NAP 11 executes a Receive Voice Message operation after sending messages. A Receive Compression field specifies a compression rate to be used for compressing received speech. A Fast Storage field specifies a type of storage to be used to store any received voice. A DB Number field specifies a number that allows the NAP 11 to associate a received voice message with a network application database so that the network application can reconcile Message IDs stored in the NAP 11 with those in the network application database. A Send Message Count field contains a number that when multiplied by 6, specifies the number of valid characters present in the Send Message Numbers field. This value is based on the number of NAP Message IDs in the Send Message Numbers field and the number of characters required for the optional speech recognition fields. An Error Message Present field specifies whether the Error Message Number field contains a valid NAP Message ID. The Error Message Number field contains the NAP Message ID of a message to be played if the time limit specified in the Receive Time Limit field is exceeded. The Receive Time Limit field specifies the maximum number of seconds that the NAP 11 allows to receive and record a message. If this time is exceeded, the NAP stores the message and sends the error message specified by the Error Message Number field (if any). A Skip Offset field specifies the amount of voice data that is to be skipped (not played) before sending the voice messages specified in the Send Message Numbers field. A Silence Limit field specifies the number of seconds of silence that will be tolerated before a receive message operation is terminated. A Discard Trailing Silence field specifies whether any recorded trailing silence will be retained. The Send Message Numbers field contains the sequence of NAP Message IDs that the PEP 372 returns to the agent 368 after expanding the prompt to be played. These Message IDs identify the actual digitized voice elements in the Voice File 33 that make up the prompt to be played to the caller. The remaining fields are related to speech recognition.

The Sentinel field always contains a value of 4"FFFFFFFFFFFF" and denotes the beginning of speech recognition data. The Opcode field is used to indicate whether the ESVM contains speech recognition data. When this is the case, as in this example, this field has a value of "02". The Unrecognized Digit field specifies the DTMF digit to return for any unrecognized utterance. The Vocabulary Module ID field specifies the VMID of the vocabulary module containing the active vocabulary, and the Vocabulary Index field specifies the VINX of the vocabulary. The VMID and VINX are two of the values returned by the PEP 372 to the agent 368 in step 452 of the flow chart of FIG. 11.

The Active Word Count specifies the number of entries in the Active Word List field that follows. The Active Word List field contains the Word Index/DTMF mappings for the words of the active vocabulary. These are the mappings that the PEP 372 obtained from the specified word list in step 448 of the flow chart of FIG. 11 and returned to the agent 368 in step 452. The DTMF digit specified in the Unrecognized Digit field should not appear in the Active Word List field.

Referring again to FIG. 12, after assembling the ESVM command in step 454 using the values returned by the PEP 372, the agent 368 passes the command to the NAP 11 for execution. At step 456, the NAP 11 plays the digitized voice for the sequence of Message IDs in the Send Message Numbers field of the ESVM command. Next, at step 458, the speech recognition software running on the TSP 370 performs a speech recognition attempt using the vocabulary and vocabulary module having the respective VINX and VMID specified in the ESVM command. Assuming that the attempt is successful, in step 460, the NAP 11 returns the DTMF of the word that was recognized (as specified in the Active Word List field of the ESVM command) to the agent 368. At step 462, the agent 368 returns the DTMF to the network application as the call flow result. This completes the process.

FIG. 14 shows an Application Options dialog box of the PC NAPTool program 352 that allows a network application developer to specify global parameters for installing a given network application on the system of FIGS. 6A–B. An Application ID field 470 specifies the name of the network application. The same name is used to refer to the application in PC SPIN 350 and in Installation Manager 354. A Version field 472 allows the developer to specify information about the application's version. A description of the application can be inserted in a Description field 474. A Platform Application Name field 476 allows the developer to specify a name (different from the application ID in field 470) that the Installation Manager 354 will use when installing the network application on the system of FIGS. 6A–B. If no name is entered in this field, the Installation Manager 354 will use the application ID in field 470. An Installation Type field 480 is used to specify whether this is a new application ("Install") or an upgrade to an existing application ("Upgrade"). An Application Settings field 482 allows the user to select certain options for the application. Of importance to the present invention is the "Use Speech Recognition" option. If this option is selected, the speech recognition capabilities of the system are made available to the application. As described above, speech recognition may then be turned on and off using the Set Language Attributes function at the appropriate point in a call flow. A languages button 486 causes PC NAPTool to display an Application Options-Languages dialog box that the developer uses to enter information about the languages and language subsets that the network application can access.

FIG. 15 shows the Application Options-Languages dialog box of PC NAPTool 352. The developer uses this dialog box to create a table 488 of information relating to each of the subsets of prompt definitions created using the PC SPIN program 350. Each entry of the table represents a particular language subset and identifies (i) the language identifier of the language to which the subset belongs (e.g., AE, SP, FR), (ii) the type of subset (e.g. MAIN, BRIEF, SPEECH, or USER), (iii) a brief description, and (iv) the SPIN ID of the SPIN application created by PC SPIN 350 that contains the prompt definitions of that subset. It is the information in this table 488 that is then used by PC NAPTool 352 and the Installation Manager 354 to create the language table 374 that the agent 368 uses during execution of a call flow (see FIGS. 4 and 6). Entries in the table 488 can be added, deleted, or modified using the input row 490. For example, to add a new entry, the developer fills in the fields in row 490 which correspond to the fields in the table, and then clicks on the "ADD" button. For ease of use, the SPIN ID field 492 in the input row 490 can be filled by selecting the appropriate SPIN ID from a list of all SPIN IDs provided in scroll window 494. Entries can be modified in the same manner by first selecting the entry (which causes its contents to appear in the input row 490), changing the field to be modified, and then clicking on the "UPDATE" button. The entries for an entire language can be deleted using the "DELETE" button.

Figure 16:
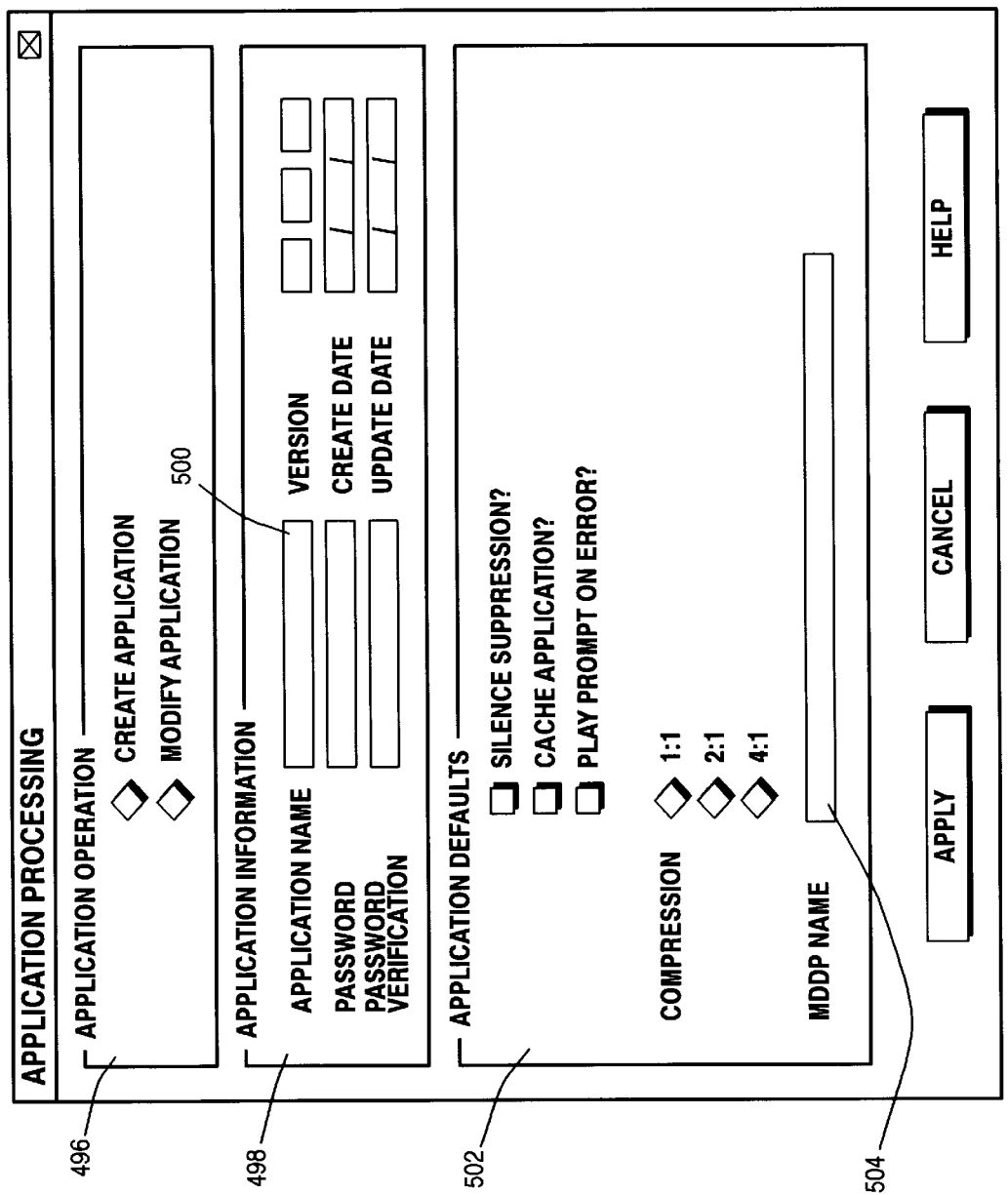
FIG. 16 shows an Application Processing dialog box of the PC SPIN program that allows a developer to create or modify a SPIN application.

FIG. 16 shows an Application Processing dialog box that is presented to a developer by the PC SPIN 350 program in order to create (or modify) a SPIN application, including its prompts, elements, dynamic element table, indexed prompt table, and vocabulary and word lists. An Application Operation field 496 allows the developer to select whether to create a new SPIN application or to modify an existing SPIN application. An Application Information field allows the developer to specify information about the application. The SPIN ID to be assigned to the SPIN application is entered in the Application Name field 500. This is the same SPIN ID that is used to associate a particular language subset with its language identifier in the Application Options-Languages dialog box (FIG. 15) of PC NAPTool discussed above. Other information that can be entered in the Application Information field 498 includes a password and certain information relating to the SPIN application's version and creation/update dates. An Application Defaults field 502 allows the developer to select certain defaults associated with the SPIN application. For example, the "Cache Application?" selection allows the developer to select whether the SPIN application's prompt definitions and other information will be automatically cached (in the cache tables 364 of FIG. 6A) when the application is installed on the system. An MDDP name field 504 is provided for entering the name of the MDDP that will process dynamic data for this application, as described above.

Figure 17:
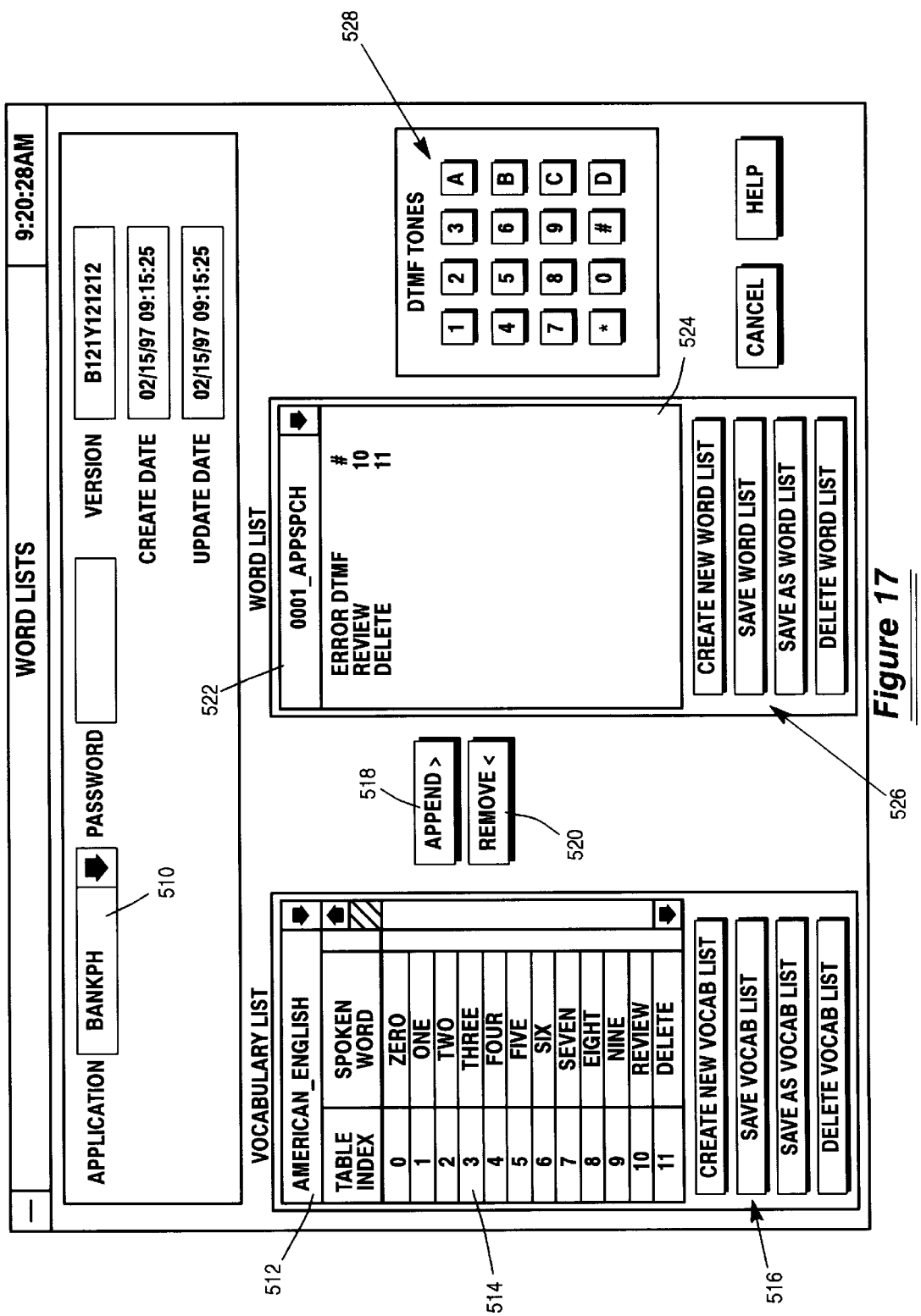
FIG. 17 shows a Word Lists dialog box of PC SPIN that allows a developer to create and edit vocabulary lists and word lists for a particular SPIN application in accordance with the present invention.

FIG. 17 shows the Word Lists processing screen of PC SPIN 350 that allows a developer to create and edit vocabulary lists and word lists for a particular SPIN application. The SPIN ID of the SPIN application is specified in field 510. A password and certain version information can also be provided. A series of buttons 516 allows the user to choose whether to create a new vocabulary list, save the vocabulary list, or delete a vocabulary list. To create a vocabulary list, the developer clicks on the Create New Vocab List button. A dialog box (not shown) pops-up prompting the developer to enter a name for the vocabulary list. This name corresponds to the name of the vocabulary module containing the words that are capable of recognition by the TSP 370. Once entered, the name then appears in the Vocabulary List field 512. The developer then enters the text of each recognizable word and its global word index within the vocabulary module in the "Spoken Word" and "Table Index" columns, respectively. The list can be saved by clicking on the appropriate button 516.

To create a word list, the developer clicks on the Create New Word List button of the series of buttons 526. This causes a dialog box (not shown) to pop-up that asks the developer to enter the VINX of the vocabulary for which the word list is being created (e.g. "0001") and an alphanumeric name for the word list (e.g. "APPSPCH"). PC SPIN 350 takes these items and creates a word list name in accordance with the preferred format described above. In the present example, the complete word list name would be "0001_APPSPCH", the first part of the name specifying the VINX of the vocabulary for which this word list is being created. The word list name then appears in field 522. To place a word into the word list, the developer either can highlight the word entry in the Vocabulary List window 514 and then click on the "Append" button 518, or can simply double-click on the word entry in the Vocabulary List window 514. This transfers the word to the Word List window 524. The developer then uses the keypad buttons 528 to select a DTMF digit to be returned for that word. This process is performed until each of the words of the present vocabulary have been entered in the word list and assigned a DTMF digit. The developer can then save the word list by clicking on the Save Word List button. As described above, the vocabulary lists and word lists created using this Word Lists processing dialog box are ultimately cached in the cache tables 364 for use by the PEP 372 during a speech recognition request. Further information concerning these lists is provided above and illustrated in FIGS. 8 and 9.

As mentioned above, the PC SPIN program presents a number of other screens (not shown) for creating the prompts, elements, Dynamic Element Table, and Indexed Prompt Table of a given SPIN application. These screens are functionally similar to the Prompt Processing screen, Element Processing screen, Modify Items For Prompt screen, Indexed Prompt Table screen, and Dynamic Element Table screen provided by the SPIN 12 program described in said U.S. Pat. No. 5,493,606, except that they provide entry and presentation of information using the graphical user interface features of the Microsoft Windows environment. The prompt definitions, elements, Dynamic Element Table, and Indexed Prompt Table created by PC SPIN are functionally the same as those created using the SPIN 12 program described in said U.S. Pat. No. 5,493,606, and further details of these items are described therein.

In a most preferred embodiment of the invention, a default SPIN application having a SPIN ID=SYSTEM is provided with the NAP platform on the A Series system. This SPIN application includes an Indexed Prompt Table, a Dynamic Element Table, an MDDP to process standard dynamic element types, default configuration values, and required prompts, elements, and voice. In this embodiment, if a requested prompt ID or word list is not found in either the base subset or an alternate subset of the currently active language after following the searching protocol described above, the PEP will further search for the requested prompt definition in the SYSTEM SPIN application. The SYSTEM SPIN application thus serves as a provider of basic prompts, elements, and voice that a network application developer can use. The SYSTEM SPIN application can also be used as a base from which to create new SPIN applications that build on the basic prompts, elements, and voice in the SYSTEM SPIN application.

As the foregoing illustrates, the present invention is directed to methods and apparatus for providing enhanced prompt management in a telephony-based system, such as a voice messaging system. The present invention improves upon the prior art by providing network application developers with the ability to play modified forms of certain prompts at different points of a call flow, without requiring any reprogramming or other modifications to the call flow. Another advantage of the present invention is that it reduces both memory and disk storage requirements needed to store prompt definitions in the system. Other aspects of the present invention are directed to methods and apparatus for performing speech recognition in conjunction with the playing of prompts. It is understood that changes may be made to the embodiments described above without departing from the broad inventive concepts thereof Accordingly, the present invention is not limited to the particular embodiments disclosed, but is intended to cover all modifications that are within the spirit and scope of the invention as defined by the appended claims.

What is claimed is:

1. A method for playing prompts during execution of a call flow of a network application, comprising the steps of:

storing a plurality of subsets of prompt definitions associated with a particular language, each subset containing prompt definitions for prompts to be played during the call low, one of said subsets being designated as a base subset;

designating, at a point in the call flow, one of said subsets of prompt definitions, other than the base subset, as an alternate subset; and thereafter, in response to a request to play a particular prompt, first searching the alternate subset to determine whether it contains a prompt definition for the requested prompt, and if so, playing the prompt according to the prompt definition in the alternate subset, but if the alternate subset does not contain a prompt definition for the requested prompt, then searching the base subset for a prompt definition for the requested prompt and playing the prompt according to the prompt definition in the base subset.

2. The method recited in claim 1 wherein at least one of the subsets contains prompt definitions for prompts to be played during only a part of the call flow.

3. The method recited in claim 1 wherein each of said subsets of prompt definitions has an identification code (ID) associated therewith, and wherein said step of designating one of the subsets as an alternate subset comprises specifying the ID associated with that subset.

4. The method recited in claim 1 wherein the prompt definitions in the base subset and in each of the other subsets has an identification code (ID) associated therewith.

5. The method recited in claim 4 wherein some of the prompt definitions in said other subsets have the same ID as a corresponding prompt definition in the base subset.

6. The method recited in claim 4 wherein said step of first searching the alternate subset to determine whether it contains a prompt definition for the requested prompt, comprises searching the alternate subset to determine whether it contains a prompt definition having the ID of the requested prompt.

7. The method recited in claim 1 wherein at least one of the prompt definitions in one of the subsets other than the base subset comprises a modified form of a corresponding prompt definition in the base subset.

8. The method recited in claim 7 wherein the prompt definitions in the base subset and in each of the other subsets has an identification code (ID) associated therewith, and wherein said at least one prompt definition in said one subset has the same ID as the prompt definition in the base subset to which it corresponds.

9. The method recited in claim 1, further comprising the step of designating, at a different point in the call flow, a different one of the subsets as the alternate subset.

10. The method recited in claim 1, further comprising the step of storing an other plurality of subsets of prompt definitions associated with an other language, each subset associated with said other language containing prompt definitions for prompts to be played during the call flow, one of said subsets associated with said other language being designated as a base subset for that language.

11. The method recited in claim 10, further comprising the step of selecting one of said languages prior to performing said designating, searching and playing steps, said designating, searching and playing steps thereafter being performed using the base subset and other subsets associated with the selected language.

12. The method recited in claim 10 wherein each of said languages is assigned a unique language identifier, and wherein the plurality of subsets of prompt definitions associated with each of said languages is assigned the unique language identifier for that language.

13. A system for executing network applications in which prompts are played at various points of a call flow in accordance with prompt definitions that specify how the prompts are to be played, comprising:

a memory containing a plurality of subsets of prompt definitions associated with a particular language, each subset containing prompt definitions for prompts to be played during the call flow, one of said subsets being designated as a base subset, means for designating, at a point in the call flow, one of said subsets of prompt definitions, other than the base subset, as an alternate subset; and means, responsive to a request to play a particular prompt, for first searching the alternate subset to determine whether it contains a prompt definition for the requested prompt, and if so, playing the prompt according to the prompt definition in the alternate subset, but if the alternate subset does not contain a prompt definition for the requested prompt, then searching the base subset for a prompt definition for the requested prompt and playing the prompt according to the prompt definition in the base subset.

14. The system recited in claim 13 wherein the base subset and each of said other subsets of prompt definitions has an identification code (ID) associated therewith, and wherein the system further comprises a memory containing a stored table indicating the ID associated with each stored subset of prompt definitions.

15. The system recited in claim 13 wherein the prompt definitions in the base subset and in each of the other subsets has an identification code (ID) associated therewith.

16. The system recited in claim 14 wherein some of the prompt definitions in said other subsets have the same ID as a corresponding prompt definition in the base subset.

17. The system recited in claim 13 wherein at least one of the prompt definitions in one of the subsets other than the base subset comprises a modified form of a corresponding prompt definition in the base subset.

18. The system recited in claim 17 wherein the prompt definitions in the base subset and in each of the other subsets has an identification code (ID) associated therewith, and wherein said at least one prompt definition in said one subset has the same ID as the prompt definition in the base subset to which it corresponds.

19. The system recited in claim 13, wherein there is further stored in said memory, an other plurality of subsets of prompt definitions associated with an other language, each subset associated with said other language containing prompt definitions for prompts to be played during the call flow, one of said subsets associated with said other language being designated as a base subset for said other language.

20. The system recited in claim 19, wherein one of said languages is selected at a point in the call flow, said means for designating and said means for searching and playing thereafter operating upon the base subsets and other subsets of prompt definitions of the selected language.

21. The system recited in claim 20 wherein each of said languages is assigned a unique language identifier, and wherein said stored table specifies, for each subset of prompt definitions, both the language identifier of the language with which it is associated and the unique ID assigned to the subset.

22. A computer system for executing network applications in which prompts are played at various points of a call flow, each prompt being played in accordance with a prompt definition identifying elements of the prompt, said computer system comprising:

a memory containing a plurality of subsets of prompt definitions associated with a particular language, each subset containing prompt definitions for prompts to be played during the call flow, one of said subsets being designated as a base subset and one of said other subsets being designated as an alternate subset; and said computer system being programmed to respond to a request to play a particular prompt at a point in the call flow by first searching the alternate subset to determine whether it contains a prompt definition for the requested prompt, and if so, playing the prompt according to the prompt definition in the alternate subset, but if the alternate subset does not contain a prompt definition for the requested prompt, then searching the base subset for a prompt definition for the requested prompt and playing the prompt according to the prompt definition in the base subset.

23. The system recited in claim 22 wherein the base subset and each of said other subsets of prompt definitions has an identification code (ID) associated therewith, and wherein the system further comprises a memory containing a stored table indicating the ID associated with each stored subset of prompt definitions.

24. The system recited in claim 22 wherein the prompt definitions in the base subset and in each of the other subsets has an identification code (ID) associated therewith.

25. The system recited in claim 24 wherein some of the prompt definitions in said other subsets have the same ID as a corresponding prompt definition in the base subset.

26. The system recited in claim 22 wherein at least one of the prompt definitions in one of the subsets other than the base subset comprises a modified form of a corresponding prompt definition in the base subset.

27. The system recited in claim 26 wherein the prompt definitions in the base subset and in each of the other subsets has an identification code (ID) associated therewith, and wherein said at least one prompt definition in said one subset has the same ID as the prompt definition in the base subset to which it corresponds.

28. The system recited in claim 22, wherein there is further stored in said memory, an other plurality of subsets of prompt definitions associated with an other language, each subset associated with said other language containing prompt definitions for prompts to be played during the call flow, one of the plurality of subsets of prompt definitions of said other language being designated as a base subset for that other language.

29. The system recited in claim 28, wherein said computer system is further programmed to select one of said languages at a point in the call flow, whereafter said computer system operates upon the plurality of subsets of prompt definitions of the selected language.

30. The system recited in claim 28 wherein each of said languages is assigned a unique language identifier, and wherein each of the subsets in each language has a unique identification code (ID) associated therewith, and further wherein the system further comprises a memory containing a stored table indicating, for each subset of prompt definitions, both the language identifier of the language with which it is associated and the unique ID assigned to the subset.

31. A computer-readable medium having stored thereon a computer program comprising instructions which, when executed by a computer, cause the computer to perform the following steps:

creating a plurality of subsets of prompt definitions associated with a particular language, each subset containing prompt definitions for prompts to be played during execution of a call flow;

designating one of the subsets of prompt definitions associated with the particular language as a base subset of prompt definitions, the base subset comprising a plurality of prompt definitions; and storing the plurality of subsets of prompt definitions in a database for access during subsequent execution of the call flow.

32. The computer-readable medium recited in claim 31, wherein at least one of said subsets contains prompt definitions for prompts to be played during only a part of the call flow.

33. The computer-readable medium recited in claim 31, wherein said medium further contains instructions for causing said computer to assign a unique identifier to each of the subsets of prompt definitions and further to generate a table associating each subset of prompt definitions with its unique ID.

34. The computer-readable medium recited in claim 31, wherein said instructions further enable the computer to create an other plurality of subsets of prompt definitions associated with an other language, each subset containing prompt definitions for prompts to be played during the call flow, and to designate one of the subsets of prompt definitions associated with said other language as a base subset for that language.

35. The computer-readable medium recited in claim 34, further containing instructions for causing the computer to assign a unique language identifier to each of the languages.

36. The computer-readable medium recited in claim 35, further containing instructions for causing the computer to assign a unique identifier to each of the subsets of prompt definitions associated with each language, and to generate a table that specifies for each subset of prompt definitions, the unique ID assigned to the subset and the language identifier of the language to which it is associated.

37. The computer-readable medium recited in claim 31, further containing instructions for causing the computer to create, in response to input from a user, a word list containing information relating to a plurality of words of a vocabulary that represent possible spoken responses that might be recognized by the computer during a speech recognition process.

38. The computer-readable medium recited in claim 37, wherein the word list is associated with one of said plurality of subsets of prompt definitions.

39. The computer-readable medium recited in claim 37, wherein the vocabulary comprises a subset of the words of a vocabulary module, and wherein the information contained in said word list comprises an identifier associated with the vocabulary, an identifier associated with the vocabulary module of which the vocabulary is a subset, and an entry for each word in the vocabulary, each entry specifying an index for that word within the vocabulary module and a DTMF digit to be returned by the computer upon recognition of the word.

* * * * *